US009051916B2

(12) United States Patent
King et al.

(10) Patent No.: US 9,051,916 B2
(45) Date of Patent: Jun. 9, 2015

(54) PORTABLE DEVICE FOR GENERATING ELECTRIC POWER

(75) Inventors: William L. King, Tehachapi, CA (US); Ghanshyam Popat, Huntington Beach, CA (US)

(73) Assignee: IQ Energy, Huntington Beach, CA (US)

( * ) Notice: Subject to any disclaimer, the term of this patent is extended or adjusted under 35 U.S.C. 154(b) by 1119 days.

(21) Appl. No.: 12/964,455

(22) Filed: Dec. 9, 2010

(65) Prior Publication Data
US 2011/0163551 A1    Jul. 7, 2011

Related U.S. Application Data

(60) Provisional application No. 61/335,376, filed on Jan. 6, 2010.

(51) Int. Cl.
| | | |
|---|---|---|
| *H02P 9/04* | (2006.01) | |
| *F03D 9/00* | (2006.01) | |
| *F03D 3/00* | (2006.01) | |

(52) U.S. Cl.
CPC ........... *F03D 3/005* (2013.01); *F05B 2240/311* (2013.01); *F05B 2240/312* (2013.01); *Y02B 10/30* (2013.01); *Y02E 10/74* (2013.01)

(58) Field of Classification Search
CPC .... F03D 3/005; F05B 2240/312; Y02B 10/30
USPC .................. 290/44, 55; 415/4.1, 2.1, 4.3, 4.5; 104/24; 416/111, 119
See application file for complete search history.

(56) References Cited

U.S. PATENT DOCUMENTS

| 206,631 | A |   | 7/1878 | Smith | |
|---|---|---|---|---|---|
| 1,526,631 | A | * | 2/1925 | Fagan | ............................... 416/8 |
| 1,791,731 | A | * | 2/1931 | Madarasz | ........................ 416/4 |
| 3,504,988 | A | * | 4/1970 | Stenner | ............................ 416/9 |

(Continued)

FOREIGN PATENT DOCUMENTS

| DE | 4035831 A1 | | 11/1990 | |
|---|---|---|---|---|
| DE | 4033078 A1 | * | 4/1992 | ................ F03D 5/00 |

(Continued)

OTHER PUBLICATIONS

Valery V. Cheboxarov, Victor V. Cheboxarov, Alexander T. Bekker, Pavel V. Anokhin-A Novel Turbine for Offshore Wind Energy; Design and Energy Conversion, Proceeding of the Twelfth (2002) International Offshore and Polar Engineering Conference, Kitakyushu, Japan, May 26-31, 2002.

*Primary Examiner* — Julio C. Gonzalez Ramirez
(74) *Attorney, Agent, or Firm* — Jay R Akhave

(57) ABSTRACT

A system for converting wind power to electrical energy has a peripheral frame, sails interconnected to the peripheral frame, radial struts extending from the hub to the peripheral frame, wheels mounted on the peripheral frame, electric generators interconnected with respective wheels, and a hub about which the peripheral frame is rotatable. The hub is in electrical communication with the electric generators. Sails may be interconnected with the peripheral frame on respective masts, each mast having a base and the mast being pivotable about the base. The electric generators may be mounted on a variety of locations, such as the peripheral frame. Each electric generator may be interconnected with a respective wheel via a belt, a chain or other mechanism. The system may include arrangements to generate electricity from sunlight.

9 Claims, 24 Drawing Sheets

(56) References Cited

U.S. PATENT DOCUMENTS

| | | | |
|---|---|---|---|
| 4,052,134 A * | 10/1977 | Rumsey | 416/119 |
| 4,527,950 A * | 7/1985 | Biscomb | 416/117 |
| 4,545,729 A * | 10/1985 | Storm | 416/132 B |
| 4,619,585 A * | 10/1986 | Storm | 416/132 B |
| 4,832,569 A | 5/1989 | Samuelsen et al. | |
| 5,758,911 A | 6/1998 | Gerhardt | |
| 6,379,115 B1 * | 4/2002 | Hirai | 416/17 |
| 6,629,815 B2 * | 10/2003 | Lusk | 415/4.2 |
| 7,385,302 B2 | 6/2008 | Jonsson | |
| 7,550,865 B2 * | 6/2009 | Jonsson | 290/55 |
| 2004/0206286 A1 * | 10/2004 | Petretto | 114/102.13 |
| 2005/0263057 A1 | 12/2005 | Green | |
| 2008/0267777 A1 * | 10/2008 | Lux | 416/132 B |
| 2011/0068581 A1 * | 3/2011 | Lowery | 290/55 |
| 2012/0068465 A1 * | 3/2012 | Dawoud et al. | 290/55 |

FOREIGN PATENT DOCUMENTS

| | | | | |
|---|---|---|---|---|
| DE | 4234649 A1 * | 7/1993 | | B61C 11/06 |
| DE | 19846012 A1 | 10/1998 | | |
| EP | 2078853 | 7/2009 | | |
| EP | 2078853 A1 * | 7/2009 | | F03D 5/04 |
| WO | WO2005046638 A2 | 5/2005 | | |
| WO | WO2007121904 A1 | 11/2007 | | |

* cited by examiner

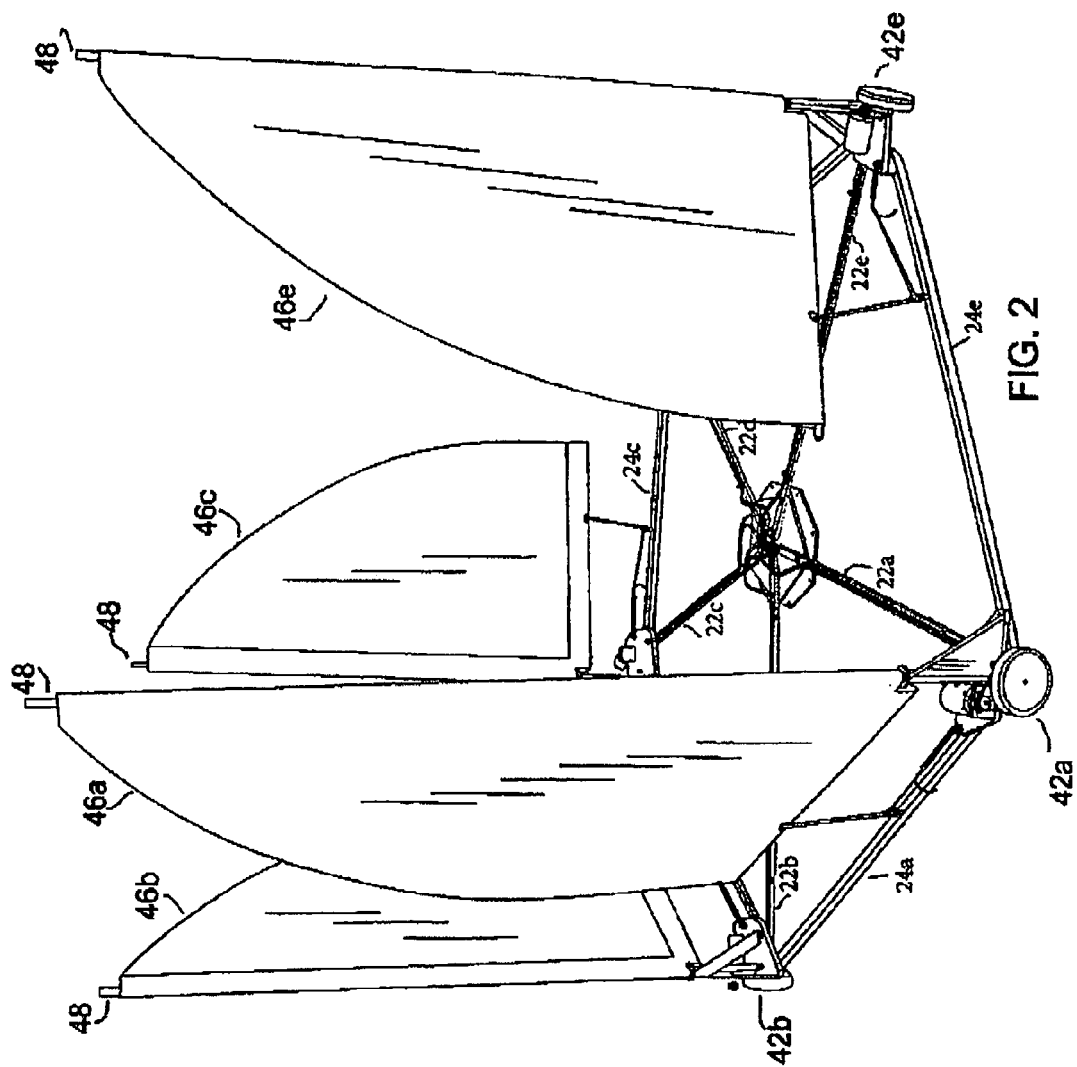

PORTABLE DEVICE FOR GENERATING ELECTRIC POWER

RELATED PATENT APPLICATIONS

This patent application claims the benefit of U.S. Provisional Patent Application No. 61/335,376, which was filed on Jan. 6, 2010 and is entitled, "Sail Carousel Wind Turbine," and which is incorporated by reference herein.

BACKGROUND OF THE INVENTION

With a growing need for sources of alternative energy, many efforts have been made to harvest wind power for electrical energy. Currently, wind power is most often harvested by constructing large numbers of windmills or other devices in a complex. The devices tend to be heavy, are prone to breaking down, and are fixed into place at a set location. Repair and maintenance of a windmill, for example, is often dangerous, as it is carried out many feet above the ground, and the cost of operating the complex can be very high.

There are many applications in which it would be useful to have a portable device for generating wind power, that could be lightweight, could be set up on a variety of surfaces, and/or be safe to maintain. For example, a system for generating electrical power may be desired in a remote area such as at a campsite. In some applications, it may be desirable to transport the system to another location, such as when a military unit moves to a new site. The system for generating electrical energy may also be desired at locations such as on the top of a roof, in a back yard, or other place where there is an open space with a relatively flat surface.

Accordingly, it would be desirable to have a system for generating electrical power from the wind in which the system could be made portable, lightweight, economical and/or easy to maintain.

SUMMARY OF THE INVENTION

Briefly, and in general terms, according to one embodiment of the present invention, a system for converting wind power to electrical energy includes a peripheral frame and sails interconnected to the peripheral frame. The system has a hub around which the peripheral frame is rotatable. Radial struts extend from the hub to the peripheral frame. Wheels are mounted on the peripheral frame. The system includes electric generators, each electric generator being interconnected with at least one respective wheel, the hub being in electrical communication with the electric generators.

The system may include one or more optional features. The sails may be interconnected with the peripheral frame on respective masts, each mast having a base and the mast being pivotable about the base. Alternatively, the mast may be fixed in place and the sail is pivotable about the mast. The electric generators may be mounted on the peripheral frame. Each electric generator may be interconnected with a respective wheel with at least one of a belt and a chain. The wheel may be interconnected with the generator such that ratio of rotation of the wheel to the rotation of the generator is greater than one. This way, the generator rotates faster than the wheel.

The hub may include positive and negative electrical terminals that are in electrical communication with the generators. In one embodiment, the hub may include a bottom plate that is fixed in place, and an upper plate that is rotatable with the radial struts relative to the bottom plate. A slip ring system may electrically interconnect the upper plate and the bottom plate. The generators may electrically interconnect the upper plate, while the upper plate is electrically interconnected to the bottom plate, and electricity is transmitted out of the system at the bottom plate.

The bottom plate may be secured to a surface. At least one sail may be interconnected with a spring, to restrain motion of the sail. The spring may be mounted, for example, on the peripheral frame. A sheet may interconnect the spring with the sail.

The system may be portable. In one embodiment, the system has a folded configuration in which the radial struts are adjacent to one another. The system may have a folded configuration in which the peripheral struts are generally parallel to corresponding radial struts and/or in which the wheels are turned inwardly toward the hub. At least one wheel may be mounted to an apex plate, the apex plate being adapted to be rotated from a first configuration in which the system is deployed, to a second configuration in which the system is folded.

The system may be mounted in a number of different ways, such as on the ground, on a platform, on a roof, or on many of a variety of different surfaces or structures.

In one embodiment, the sail may be a sail wing or a hybrid sail wing or another form of sail.

At least a portion of the sail may generate electricity from sunlight. The system may include a fairing at the leading edge of the mast, the fairing being secured to the sail. The fairing may fold over the mast and may be attached to the sail. The system may include leading edge formers within the faring. The sail may include at least one elongated opening at which the fairing is slidably connected to the sail. The fairing may include at least one elongated opening on either side of the fairing through which the sail is slidably mounted.

The sail may be part of an assembly that includes a leading edge adapted to generate electricity from sunlight. The sail may be adapted to generate electricity from sunlight. The sail may include a solar sensitive film and/or solar cells and/or solar sensitive material coated onto and/or infused into at least a portion of the sail. The system may include solar power-generating film in between the base and the circumferential struts.

In another particular embodiment, a system for converting wind power to electrical energy includes a peripheral frame, sails interconnected to the peripheral frame, a hub around which the peripheral frame is rotatable, radial struts extending from the hub to the peripheral frame, wheels mounted on the peripheral frame, and a plurality of electric generators, each electric generator being interconnected with at least one respective wheel. The sails may be interconnected with the peripheral frame on respective masts, each mast having a base and the mast being pivotable about the base. The electric generators are mounted on the peripheral frame, and each electric generator is interconnected with a respective wheel. The hub may include positive and negative electrical terminals that are in electrical communication with the generators. The hub may include a bottom plate that is fixed in place, and an upper plate that is rotatable with the radial struts relative to the bottom plate, the upper plate being electrically interconnected with the bottom plate. This embodiment may include any of the optional features described above.

Another embodiment of a system for converting wind power to electrical energy includes a peripheral frame comprising peripheral struts, sails interconnected to the peripheral frame, a hub around which the peripheral frame is rotatable, radial struts extending from the hub to the peripheral frame, wheels mounted on the peripheral frame, and a plurality of electric generators, each electric generator being interconnected with at least one respective wheel, the hub being in electrical communication with the electric generators. The system has a deployed configuration for generating electricity, and a folded configuration in which the peripheral struts and the wheels are generally parallel to corresponding radial struts. The system may optionally include solar power-generating film in between the hub and the circumferential struts. This embodiment may also include any of the optional features described previously.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 2 is a perspective view of another embodiment of a device for generating electric power according to the present invention;

LIST OF REFERENCE NUMBERS

Figure 1:
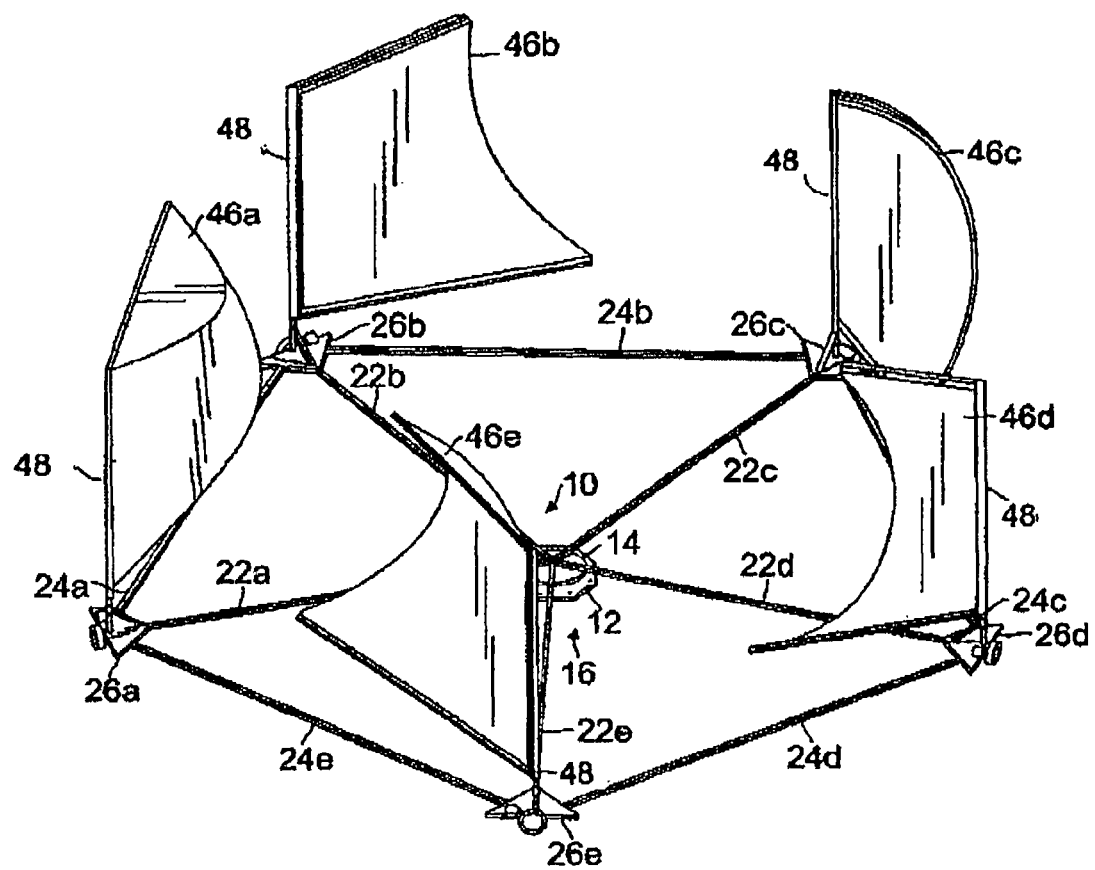
FIG. 1 is a perspective view of one embodiment of a device for generating electric power according to the present invention.

10 Fixed Base Assembly
12 Bottom Plate with Stakes
14 Rotating Portion
16 Slip Rings & Bearings
22 Radial Struts d (5 each)
24 Circumferential Struts d (5 each)
26 Apex Plate Assembly (5 each)
28 Plate
30 Mast Socket & Struts
32 Alternator & Base
34 Alternator Pulley or Sprocket
36 Wheel Assembly (5 each)
38 Axle
40 Axle Mounts
42 Wheel & Tire
44 Belt or Chain Drive
46 Sail
48 Mast
50 Boom
52 Boom Rope (Sheet)
54 Sheet Pulley
56 Spring-loaded Sail Control Assembly
58 Holes in the Apex Plate
60 Removable Hub Bolts
62 Hub Bolts That Remain in Place for Folding the Assembly
70 sail
72 semi-rigid leading edge
74 photo voltaic material
76 solar sensitive strips
78 solar sensitive material infused or painted onto sail material
80 conductive wires
90 sail
92 mast
94 cord
96 fairing
98 mast/sail joint
100 bolt assembly
102 leading edge formers
104a-c elongated slots
106 stepped disc
108 solar film

DETAILED DESCRIPTION OF THE INVENTION

Figure 12:
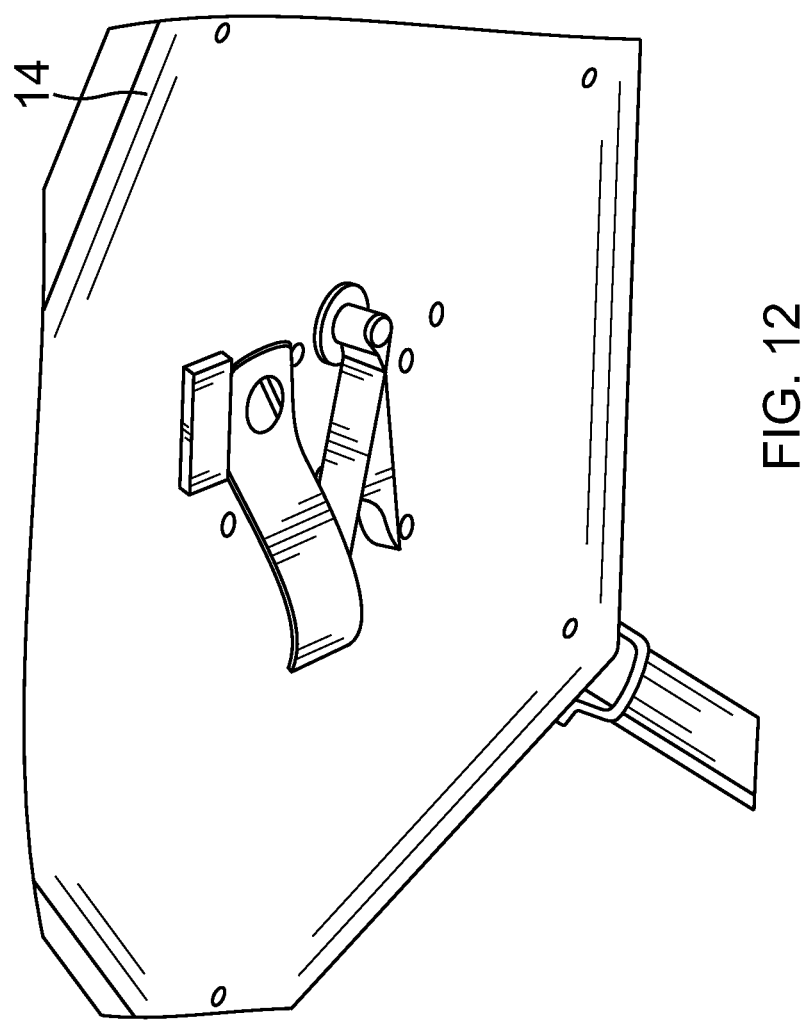
FIG. 12 illustrates the underside of the rotating upper plate of the hub assembly, and showing the brushes of a slip-ring-and-bearing assembly.
Figure 13:
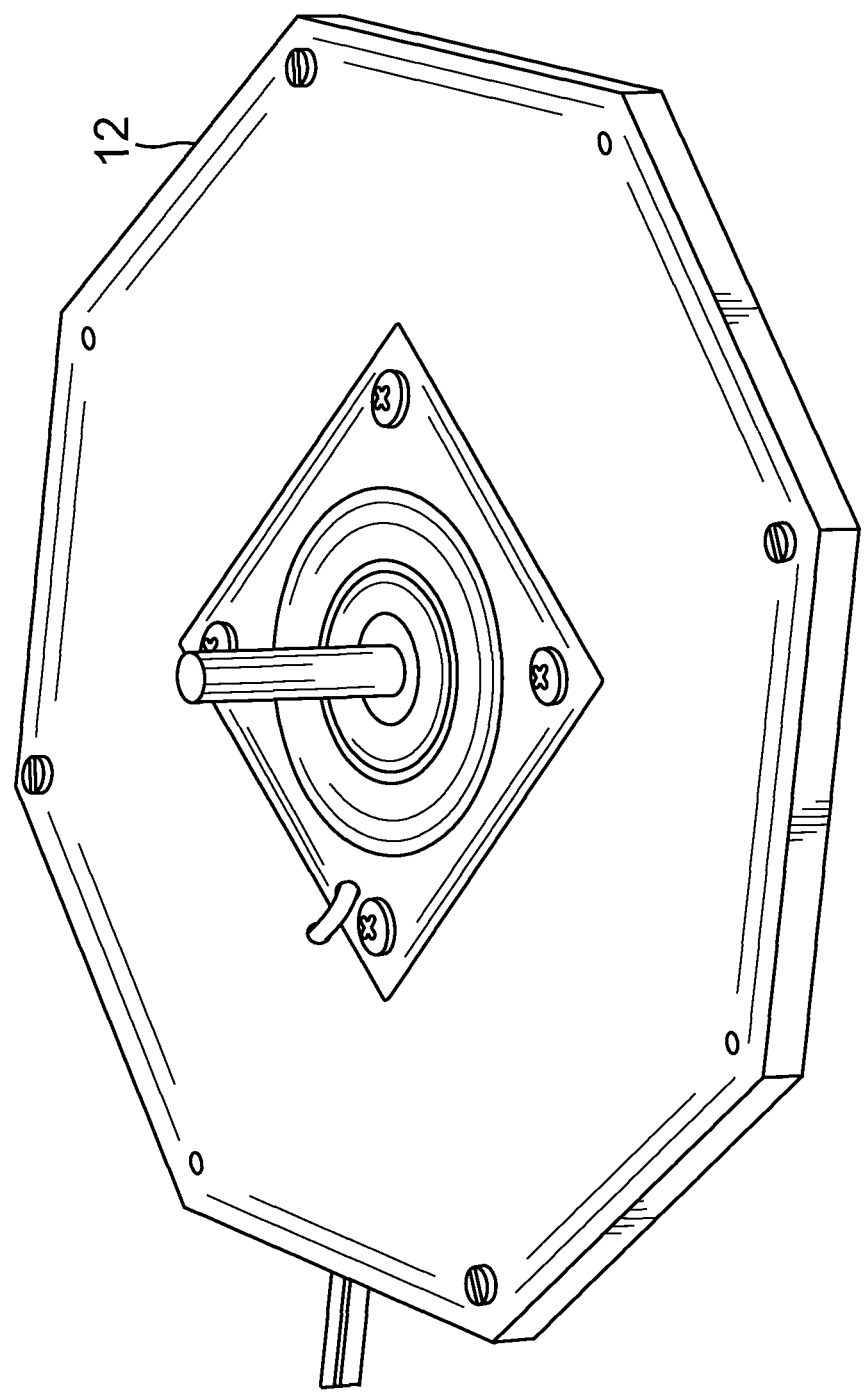
FIG. 13 illustrates the fixed bottom plate of the hub assembly.
Figure 14A:
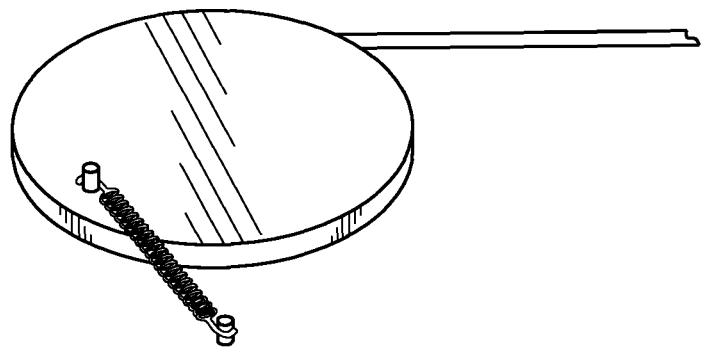
FIGS. 14a-d illustrate one embodiment of a non-linear pulley tension system.
Figure 14B:
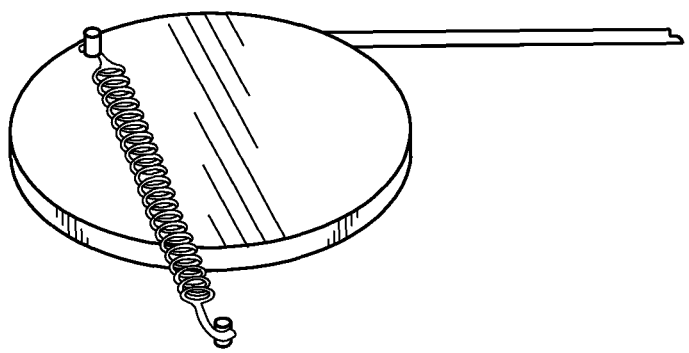
Figure 14C:
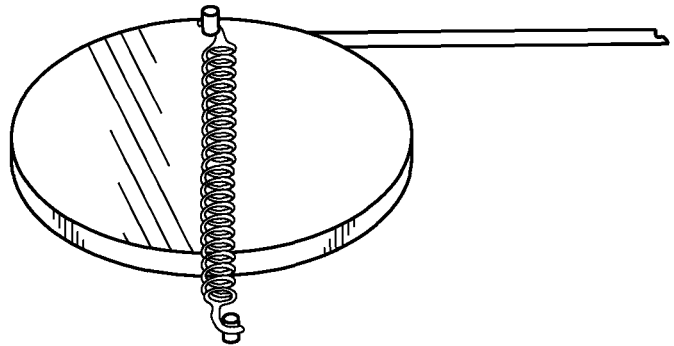
Figure 14D:
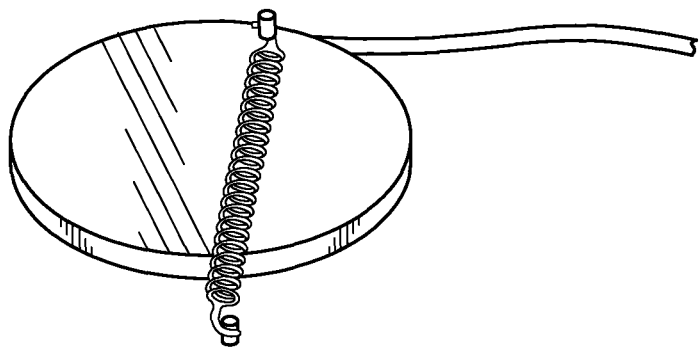
Figure 15A:
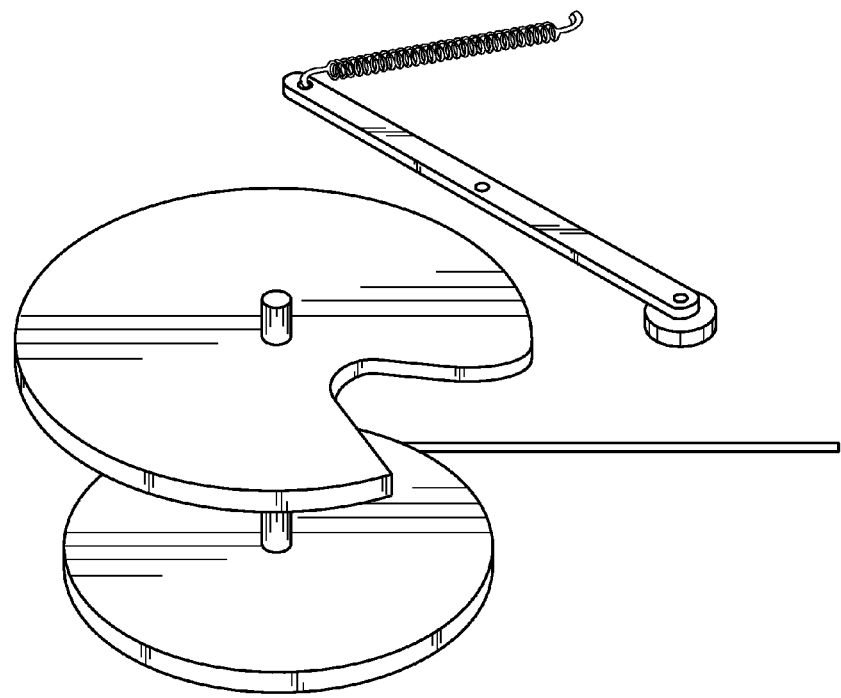
FIGS. 15a-d illustrate one embodiment of a non-linear spring assembly that includes a cam and follower arrangement.
Figure 15B:
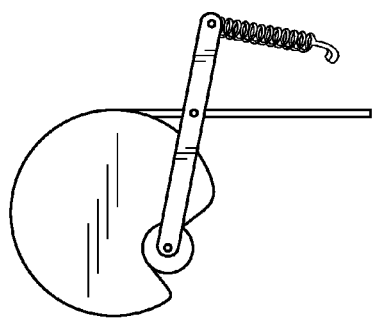
Figure 15C:
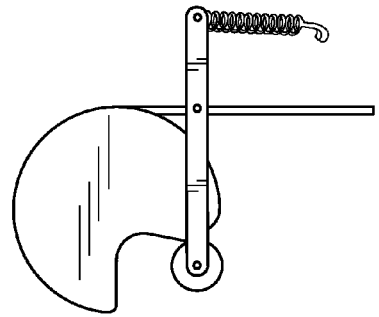
Figure 15D:
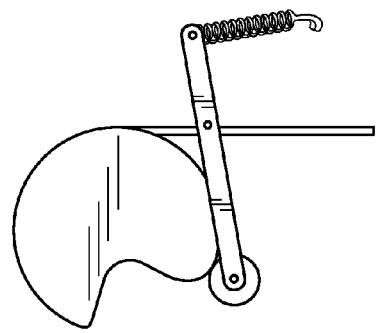

Referring now to the drawings, which are provided by way of example and not limitation, one embodiment of a portable electric energy generation system is illustrated in FIG. 1. The generator includes a fixed based assembly 10 having a bottom plate with stakes 12 and an upper rotating portion 14. The fixed base assembly 10 also includes slip rings and bearings 16 (FIG. 12).

Extending from the fixed base assembly 10 are radial struts 22a-e. These radial struts interconnect with an outer frame having circumferential struts 24a-e. The circumferential struts 24a-e interconnect with respective apex plate assemblies 26a-e.

FIG. 2 illustrates a second embodiment in which the sails have a somewhat different configuration. Each sail is constrained by a spring mechanism such that as the sail rotates, the spring mechanism pulls on the sail. The springs in this embodiment are linear springs, although non-linear spring arrangements may be employed.

The lower plate is secured, in FIG. 2 for instance, to the underlying surface which, in the case of FIG. 2, is a wooden board. The underlying surface can alternatively be the ground, a rooftop, or any other surface that is suitable for mounting the power-generating unit. Typically, the underlying surface will be flat, so that the wheels can roll in an even pattern. But the underlying surface may not be perfectly flat, and the system may be operated on a variety of different surfaces and terrains.

Figure 4:
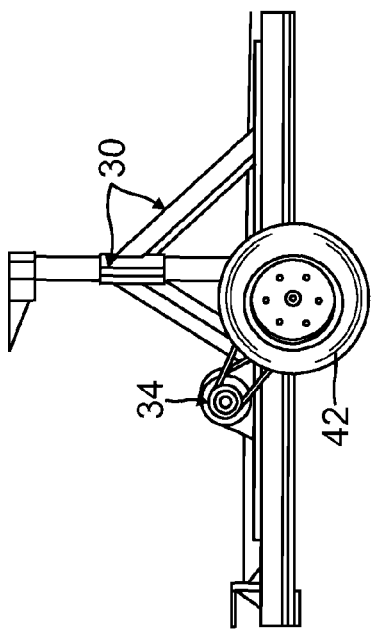
FIG. 4 is a side detail view of a wheel and alternator assembly of the embodiment of FIG. 1.
Figure 3:
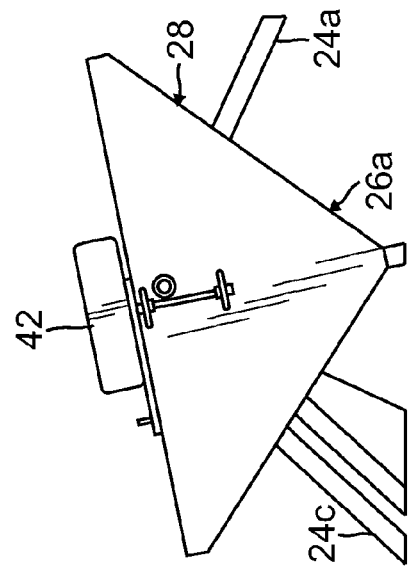
FIG. 3 is a bottom detail view of an apex plate assembly of the embodiment of FIG. 1.
Figure 6:
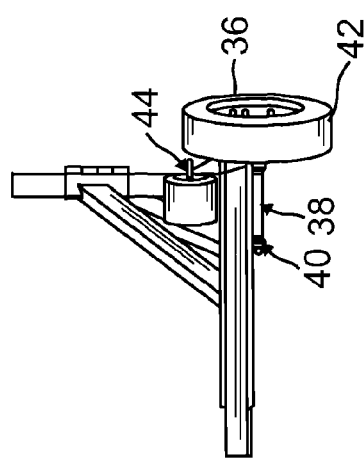
FIG. 6 is a front detail view of a wheel assembly of the embodiment of FIG. 1.
Figure 5:
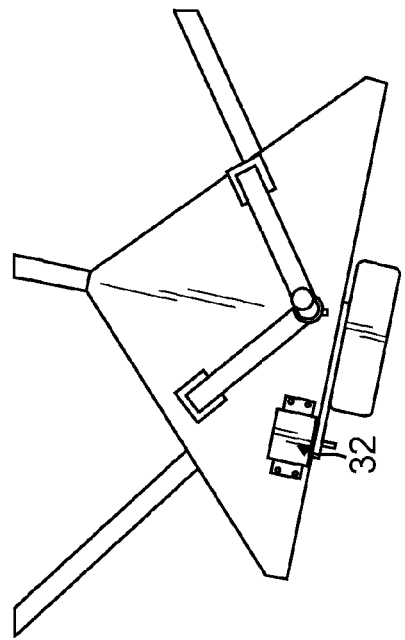
FIG. 5 is a top detail view of an apex plate assembly of the embodiment of FIG. 1.
Figure 7:
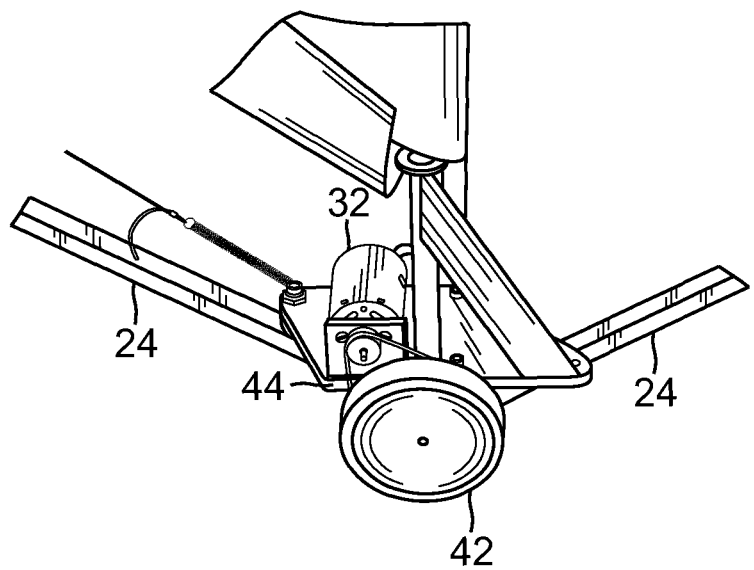
FIG. 7 is a perspective view of a wheel assembly of the embodiment of FIG. 2.

FIG. 3 illustrates the apex plate assembly 26a to which are connected struts 24e and 24a. The assembly includes a plate 28, a mast socket and related struts 30 (FIG. 4) and alternator and base 32 (FIG. 5) and an alternator pulley or sprocket 34 (FIGS. 4 and 7). FIG. 6 illustrates a wheel assembly 36. The wheel assembly includes an axle 38, and it also includes a wheel and tire 42 and a belt or chain drive 44 extending from the tire 42.

Returning to FIG. 1 the assembly includes a sail system that includes sails 46a-e. Associated with each sail 46 is a mast 48 and a boom 50. Associated with each boom 50 is a boom rope, also known as a sheet, and a sheet pulley 54. Optionally, a spring loaded sail control assembly may be included. Sail control can be as simple as a spring attached to the sheet, allowing the wind force on the sail to move the sail to a more-or-less advantageous angle relative to the wind vector. A further development of spring tension on the sheet would be a cam and spring arrangement that would control the sail more precisely and allow for a slowing or stopping of the sails in high winds. (See, e.g., FIG. 15).

Figure 8:
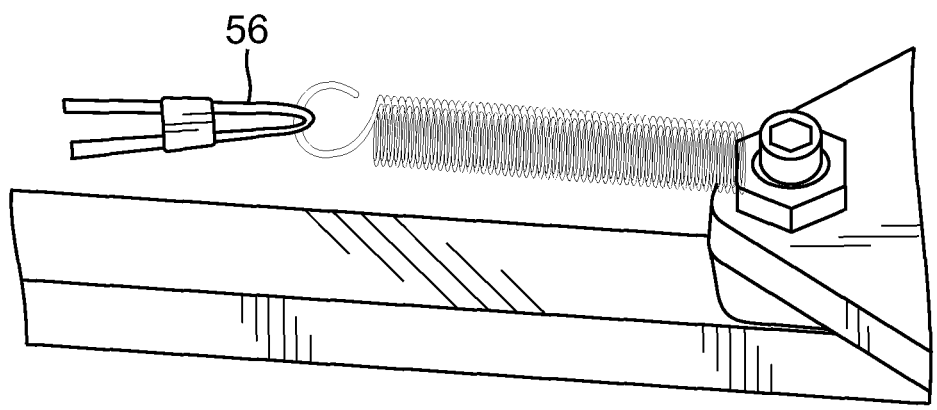
FIG. 8 is a side view of a spring mechanism for controlling a sail.
Figure 9:
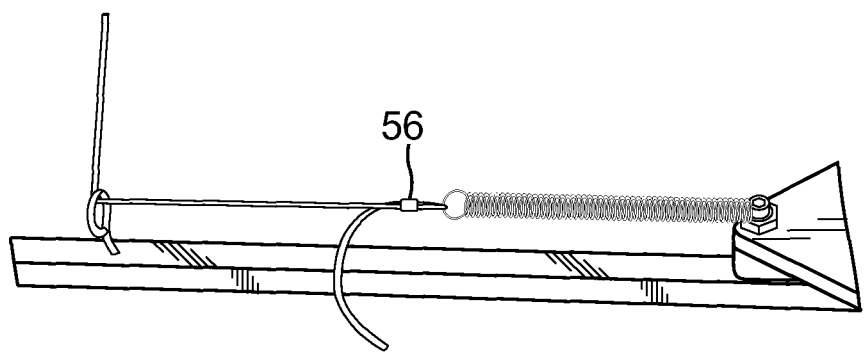
FIG. 9 is the spring mechanism of FIG. 8, with the spring stretched in response to displacement of the sail.

FIG. 8 illustrates a sail-constraining mechanism in same detail. A linear spring is mounted onto the plate that supports the wheel. A rope or "sheet" is interconnected with the spring, such that as the rope is pulled, the spring is put into tension. (FIG. 9). In this way, the rope goes into tension as the sail is constrained by the spring and rope assembly.

Figure 10:
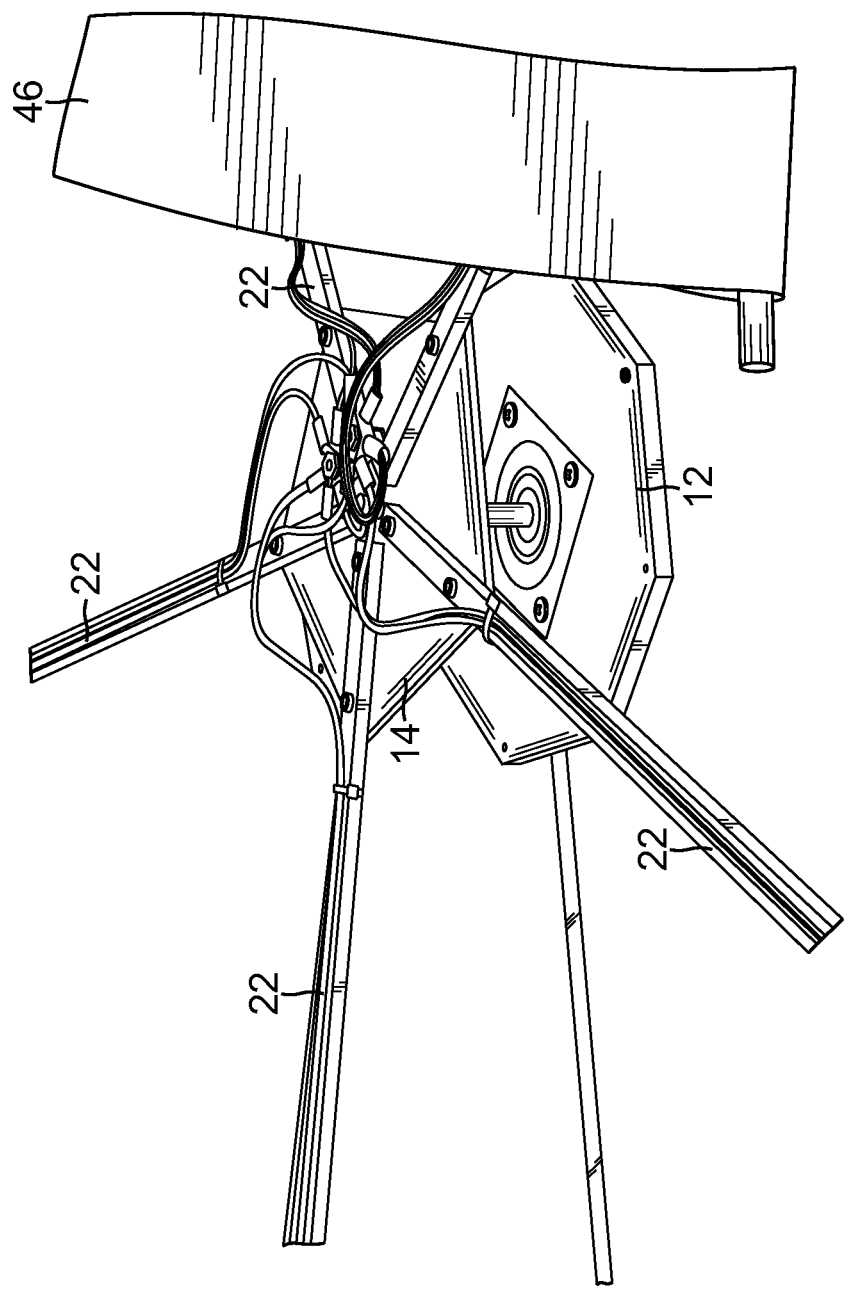
FIG. 10 is a perspective view of a partially-disassembled hub assembly.
Figure 11:
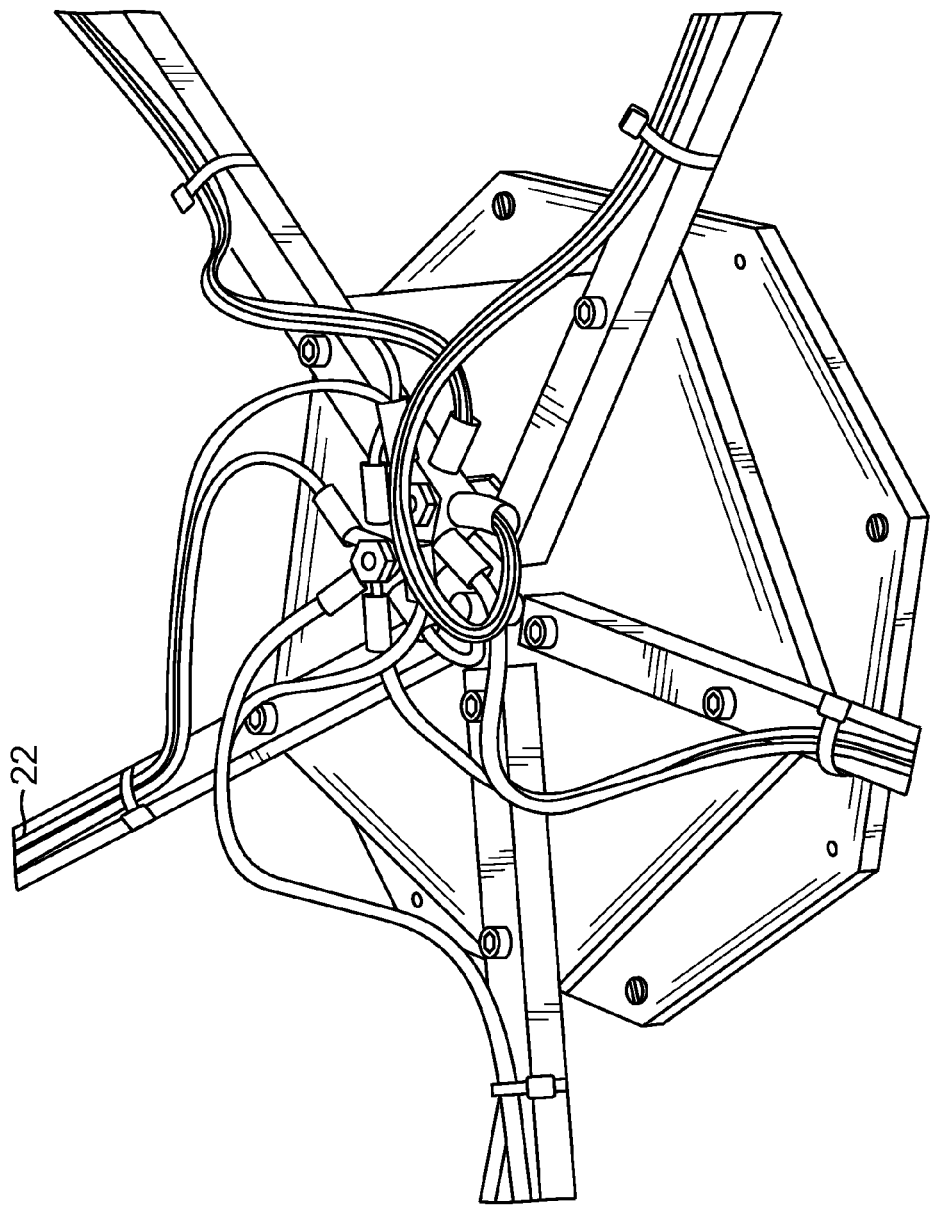
FIG. 11 is a perspective view of a hub assembly, with positive and negative terminals.

FIG. 10 illustrates the central hub, which has a stationary lower plate that is secured to the ground or to another surface. The lower plate includes an upwardly-extended spindle, on which the upper plate is rotatably mounted. A plurality of electrical wires extend to the hub, with positive wires meeting at a positive terminal, and negative wires meeting at a negative terminal. (FIG. 11). The lower surface of the upper plate includes two brushes for contacting the lower plate. (FIG. 12).

One brush is electrically inter-connected with the positive terminal 21, and the other brush comes into contact with the lower plate on a contact plate to which a conductive wire is attached. The other brush comes into contact with the lower plate itself, from which another wire extends. In this way, the negative and positive leads that originate at the generators adjacent to the wheels are electrically interconnected with the lower plate. An electric cable extends from the lower plate to carry the power to a location external to the hub.

As seen in FIG. 11, wires run from the generators along the radial struts. In alternative embodiments, the wires may run through the center of the radial struts, rather than along an outside surface.

Regarding the spring arrangement, a non-linear spring mechanism can be utilized that varies the spring force based on the amount the sail rotates. FIG. 14a-d illustrates one non-linear spring control system in which a sheet is interconnected with a rotating disk. A spring is also connected to the rotating disk as illustrated. As the sheet becomes taut, the spring stretches from an initial position as the disk rotates. As tension on the sheet increases, the spring attach point on the pulley moves to a position of less leverage on the spring (14b). As the attach point reaches the maximum extension of the spring, leverage on the pulley is lost (14c). As the attach point goes "over center," the spring actually pushes the sheet to a slack position.

Other non-linear spring arrangements are possible, such as a cam and follower arrangement illustrated in FIGS. 15a-d. With the cam at 0° (FIG. 15b), the sail is held at a low angle. With the cam at 60° (FIG. 15d), the sail is no longer under tension. The cam is free to rotate, and the sail luffs.

With regard to FIGS. 14a-d and 15a-d, experience has shown that a sail vehicle being driven across the wind (90° to the wind direction) can be pushed at speeds exceeding the wind speed by a significant margin. This relative motion between the wind and the vehicle's motion produces a vector. The velocity portion of the vector can exceed the velocity of the wind.

Figure 16:
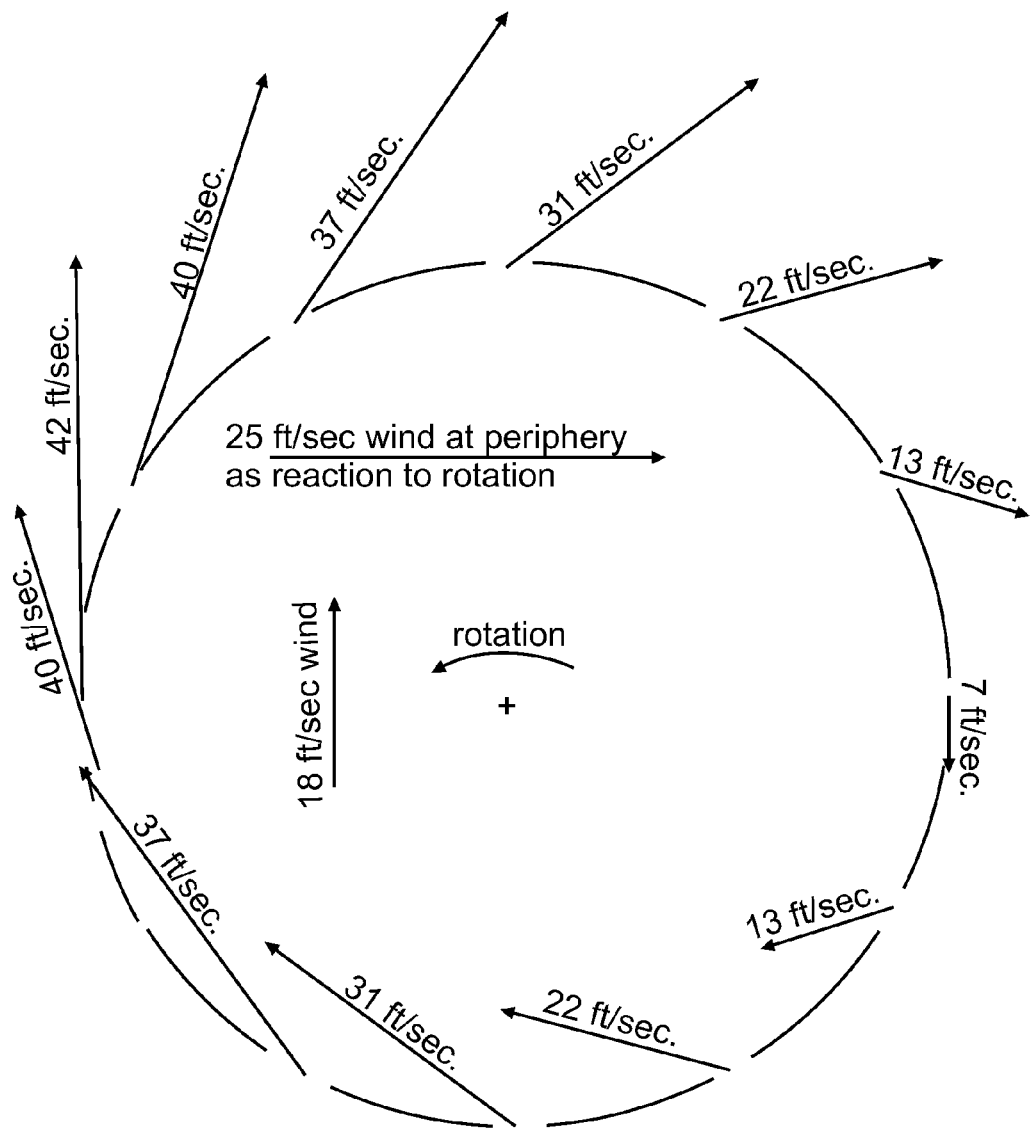
FIG. 16 is a vector diagram of the sail system at a given wind speed.

The example of FIG. 16 is based on one illustrative, non-limiting embodiment of a 40-ft. diameter sail array in an 18 ft./second (12 mph) wind. This 18 fps wind causes a 25 fps motion at the sail array periphery. The array is rotating counter-clockwise when viewed from above, which causes a 25 fps wind at the periphery that appears to be in a clockwise direction.

As can be determined by the vector diagram, the total angular change of the resultant wind vector is about 88° total, 44° each side of the peripheral tangent. The sails will not normally need to sweep through such a large angle because of the aerodynamics of sail work production. The sails require an angle of attack to the local wind vector. This angle of attack is about 9° to 15° in this one embodiment, but varies in other embodiments, dependent on the design and tightness (trim) of the sail.

For purposes of discussion, we will assume an angle of attack of 12°, which reduces the total sweep of the sail to 64°. In one embodiment, the lower edge of the sail is defined and controlled by a boom. The boom will not need to sweep through this 64° angle, due to the fact that the sail billow allows the sail to twist to a larger angle. This twist due to billow has an aerodynamic advantage, due to wind gradient. The twist due to billow can vary, but for purposes of discussion, we will assign a 9° angle due to twist. This further reduces the required sail angle sweep to a total angle of 23° per side (46° total). The foregoing discussion is for purposes of illustration only, and does not limit the invention herein.

A simple spring tension device on the boom cable, called a sheet in sailboat conventions, as illustrated in FIGS. 14a-d and 15a-d, can control the sail's response to the wind vector reasonably well. A conventional spring increases its force linearly with displacement. Under benign wind conditions, this wind-dependent angle change will cause the sails to operate at a more or less optimum angle of attack. However, as wind speeds increase, forces also increase, sometimes to the detriment or destruction of the entire device.

In many embodiments, it is desirable to allow these sails to move farther to a lower angle of attack, or even "luff" (present no angle of attack at all) when the wind exceeds a predetermined force. This self-protecting action can be achieved by using a non-linear spring arrangement. A non-linear spring can be designed to reduce tension as its travel increases, thereby allowing the sail to be more easily deflected after a certain amount of angular deflection.

There are many ways of creating a non-linear spring assembly. An example would be a tension spring attached to a pulley at a geometric point such that, as the pulley passes through a portion of its rotation, the angular advantage of the pulley over the spring increases, i.e., more rotation results in less spring force. If the geometric point moves past a point in which the line of force from the spring moves across a line from the pulley pivot point, and the spring's fixed anchor point (e.g., goes "over-center"), the line will lose all tension and the sail is free to align with the wind, or "luff." This spring and pulley arrangement is reasonably simple and effective. This effect can also be achieved with levers and pivots, with no pulleys required.

Figure 17:
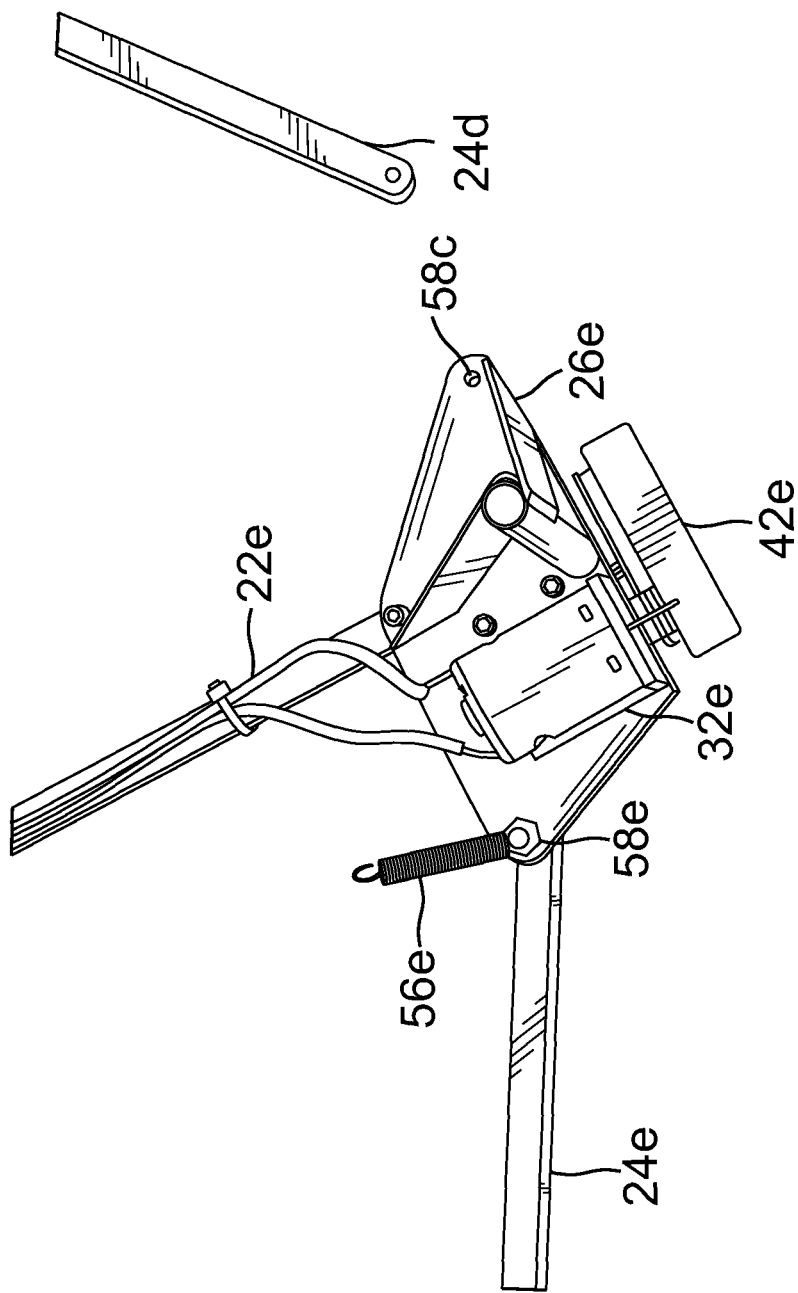
FIG. 17 is a top view of first step in collapsing one embodiment of the present invention.
Figure 18:
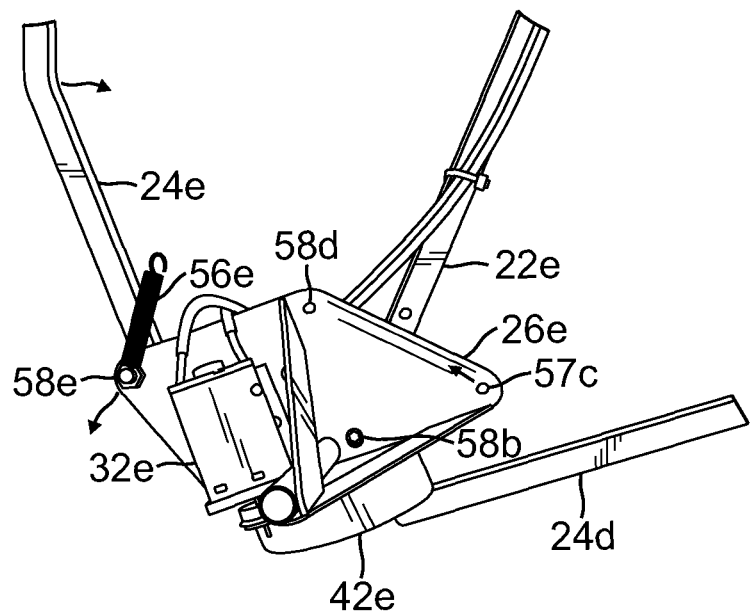
FIG. 18 is a top view of a second step in collapsing an embodiment of the present invention.

One alternative is to change the moving reaction point on a pulley to a cam-and-spring-loaded follower, mounted to the pulley, as illustrated in FIGS. 15a-d. This arrangement has the advantage of being designed to have a more advantageous resistance versus sail angle curve. The over-center action would be much gentler and could have a detent to hold the cam in its loose-line (sail luffing) position Considering now collapsing of the assembly, FIG. 17 illustrates disengagement of a peripheral strut 24d from the apex plate 26e. In this embodiment, a bolt is simply removed at 58c, thereby freeing the peripheral strut 24d, as also seen in FIG. 18. The spring 56e, which is mounted at 58e, is also disengaged from the sheet leading to the sail.

Figure 19:
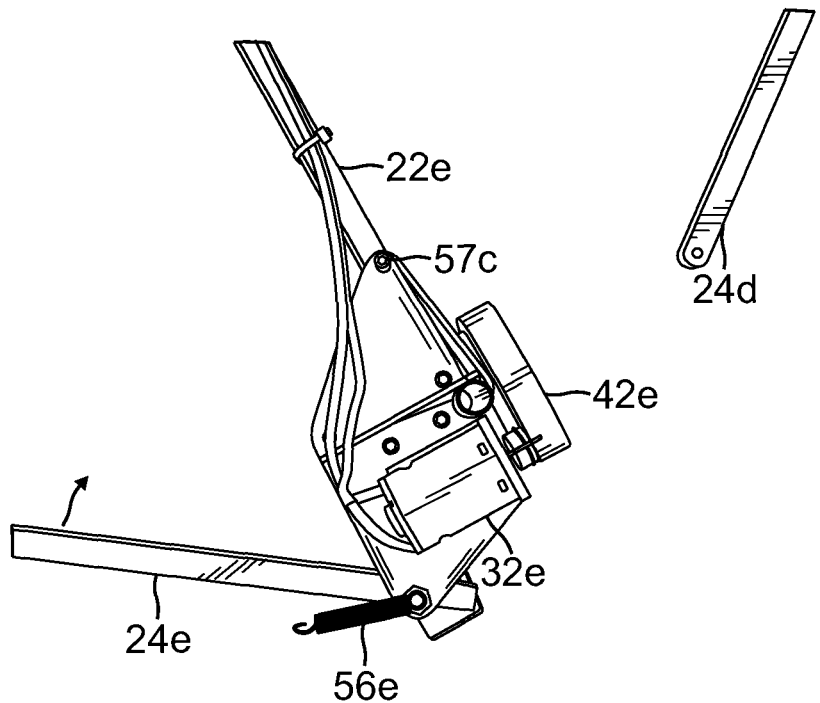
FIG. 19 illustrates rotating the apex plate to rotate the wheel inwardly toward the hub.

In FIG. 18, a second bolt has been removed from the apex plate at 58d, allowing the radial strut 22e to disengage from the apex plate 26e. The apex plate 26e can now be rotated inwardly, as shown in FIG. 19, with the wheel 42e now pointing to the hub and generally parallel to a radial strut 22e. In FIG. 19, the apex plate has been bolted at point 58c to radial strut 22e, to lock the wheel into position.

Figure 20:
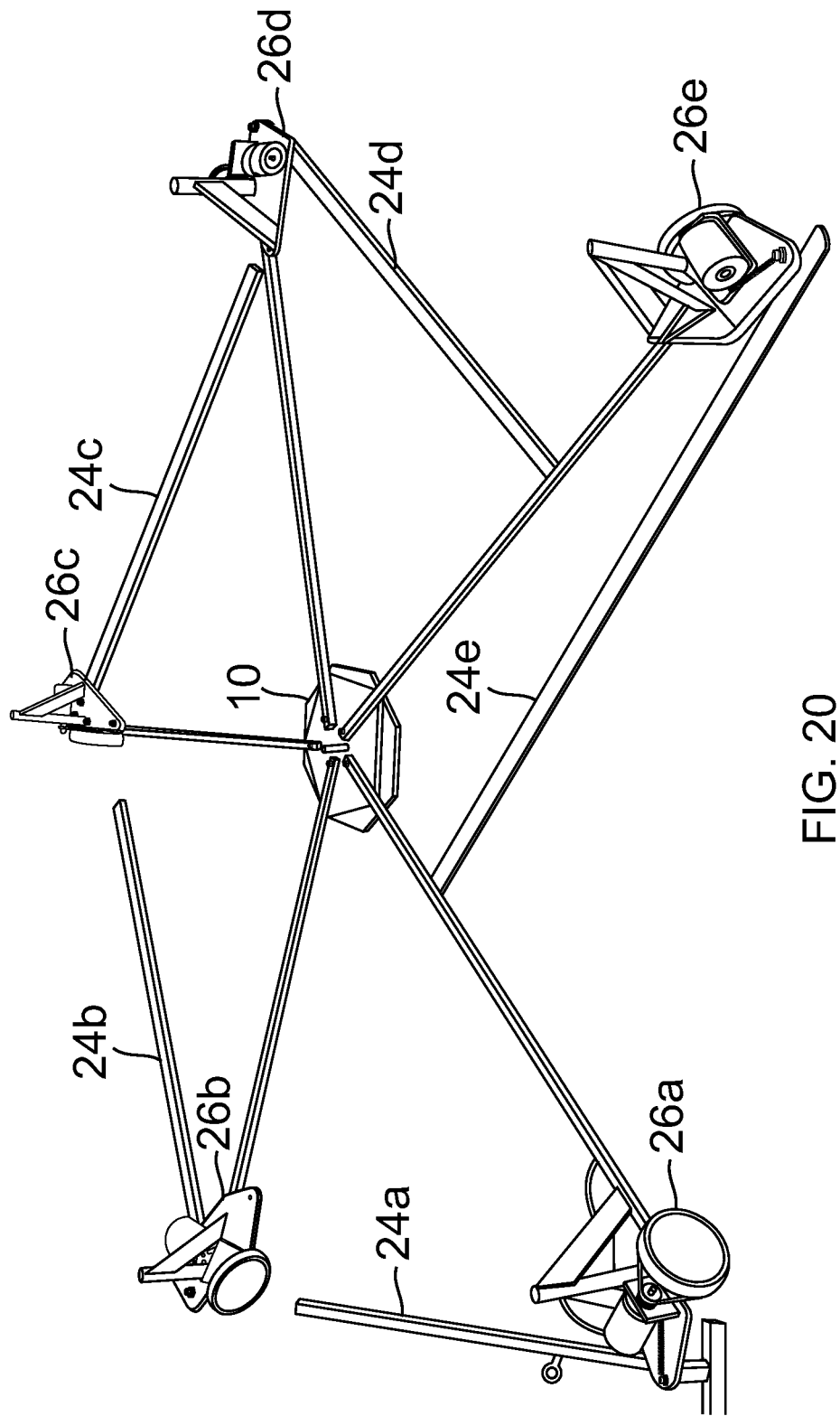
FIG. 20 illustrates a frame according to the present invention with wheels turned inwardly toward the hub and each of the peripheral struts disengaged at one end.

Similar action is taken with respect to all of the wheels, as seen in FIG. 20, and the assembly is ready for collapse. In FIG. 20, all of the apex plates are rotated. The peripheral struts are detached from their respective apex plates, and are swung to be parallel with corresponding radial struts.

Figure 21:
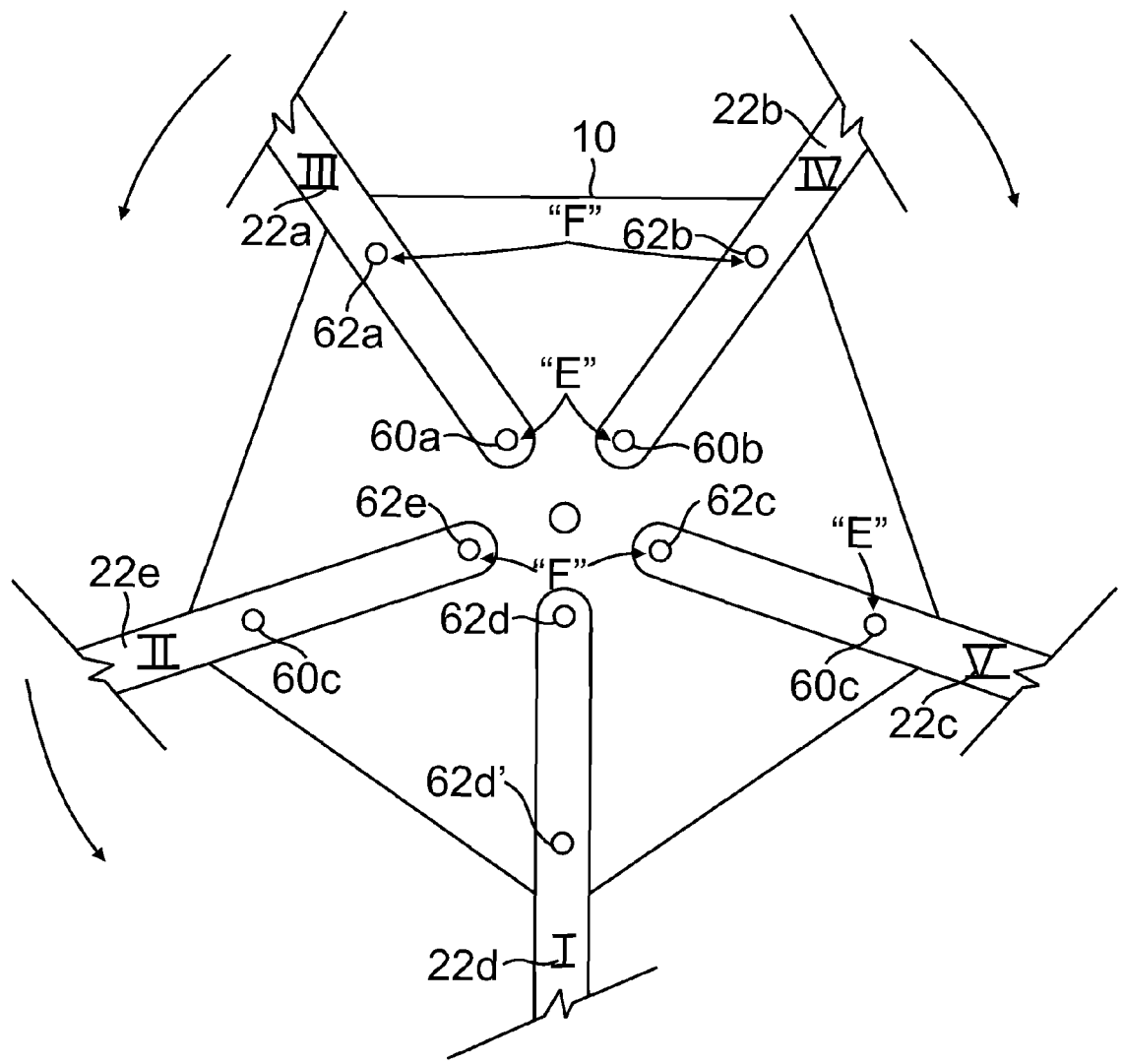
FIG. 21 illustrates details of the folding of struts on the hub.

FIG. 21 illustrates the central hub, and the radial struts attached to the central hub. To prepare the struts to be rotates into the folded position, bolts at location are removed. Bolts at locations 62a-e remain fastened in place. The radial struts can then be rotated into the "folded" position of FIG. 22.

Figure 22:
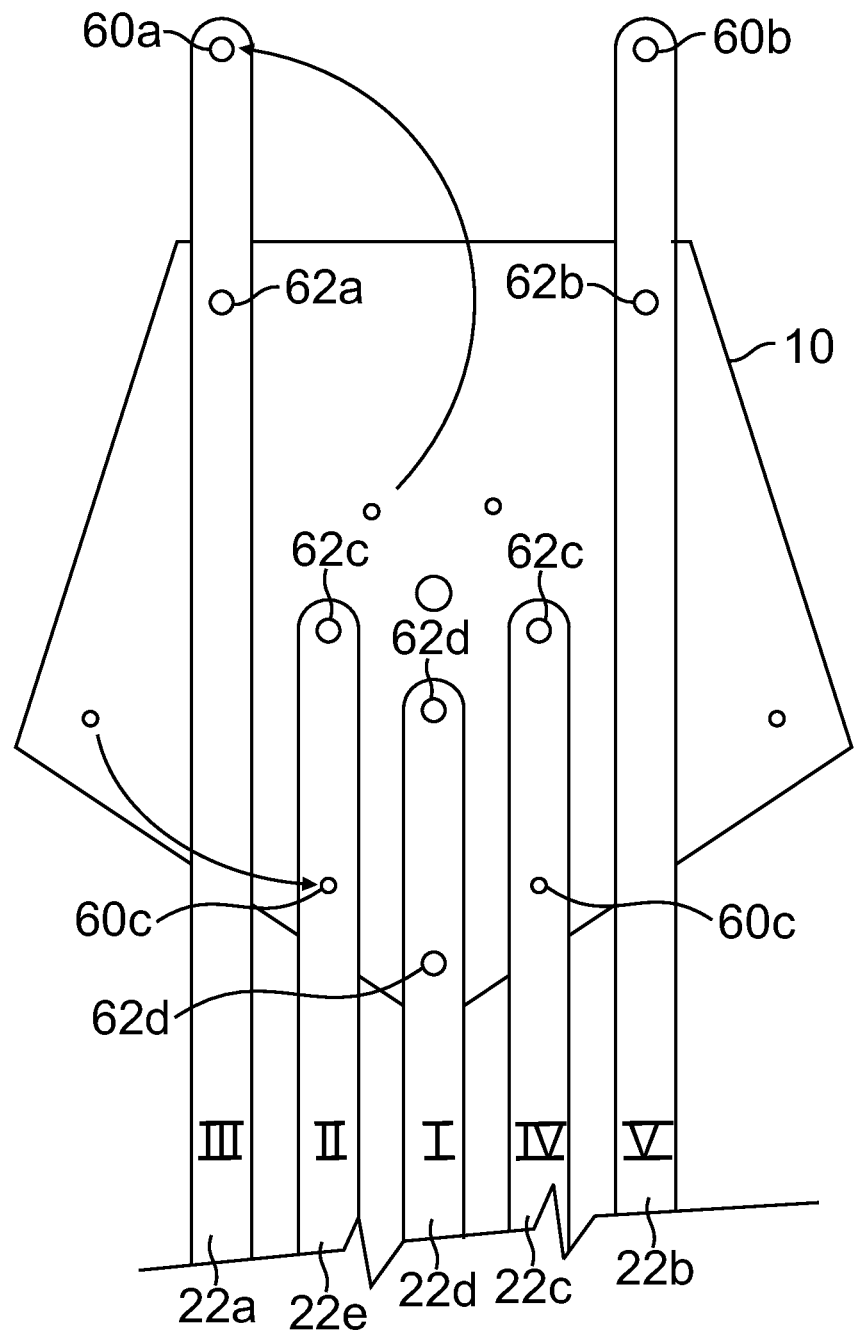
FIG. 22 illustrates details of struts on the hub having been moved into folded position.
Figure 23:
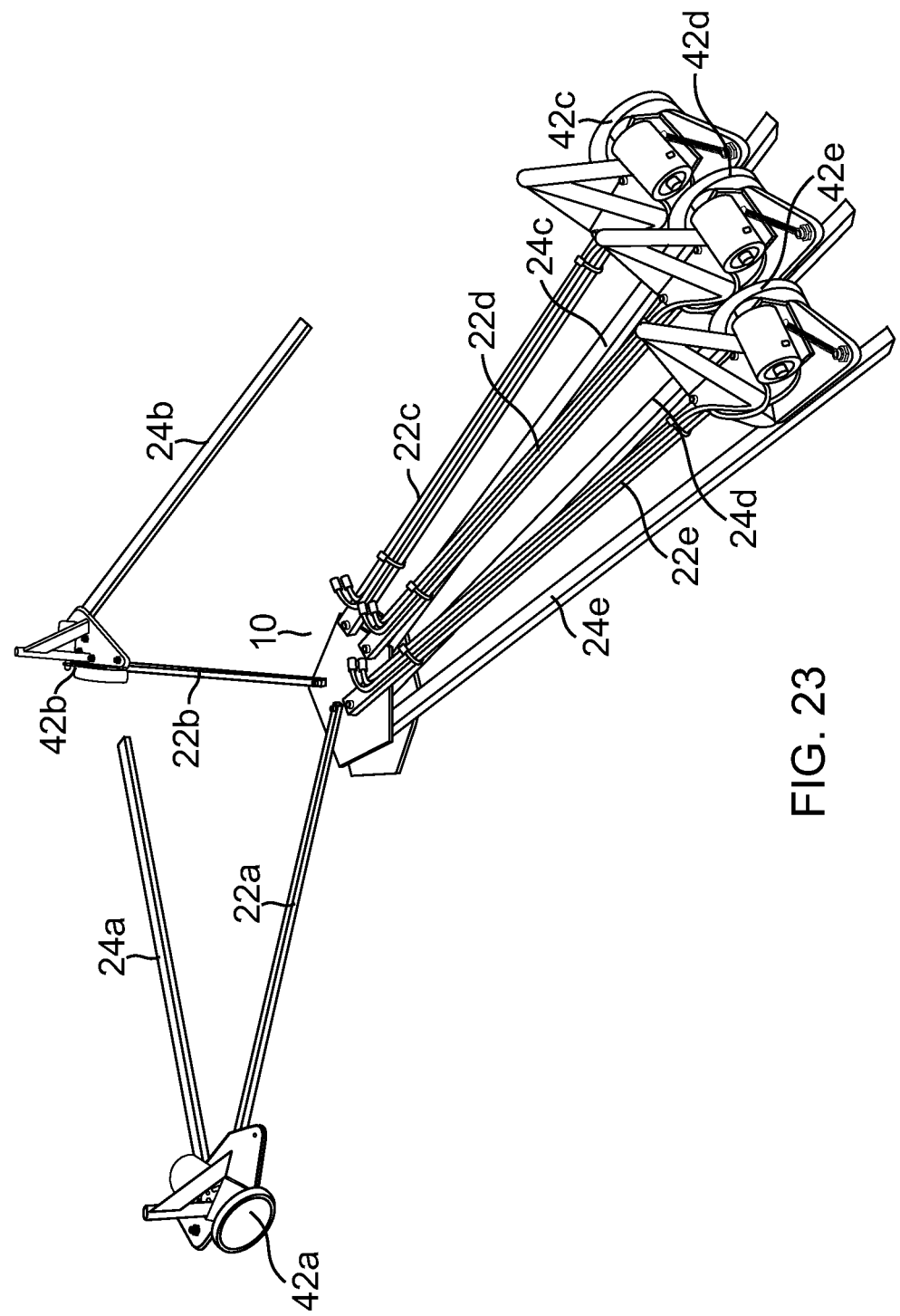
FIG. 23 illustrates a frame according to the present invention with several wheel assemblies together.
Figure 24:
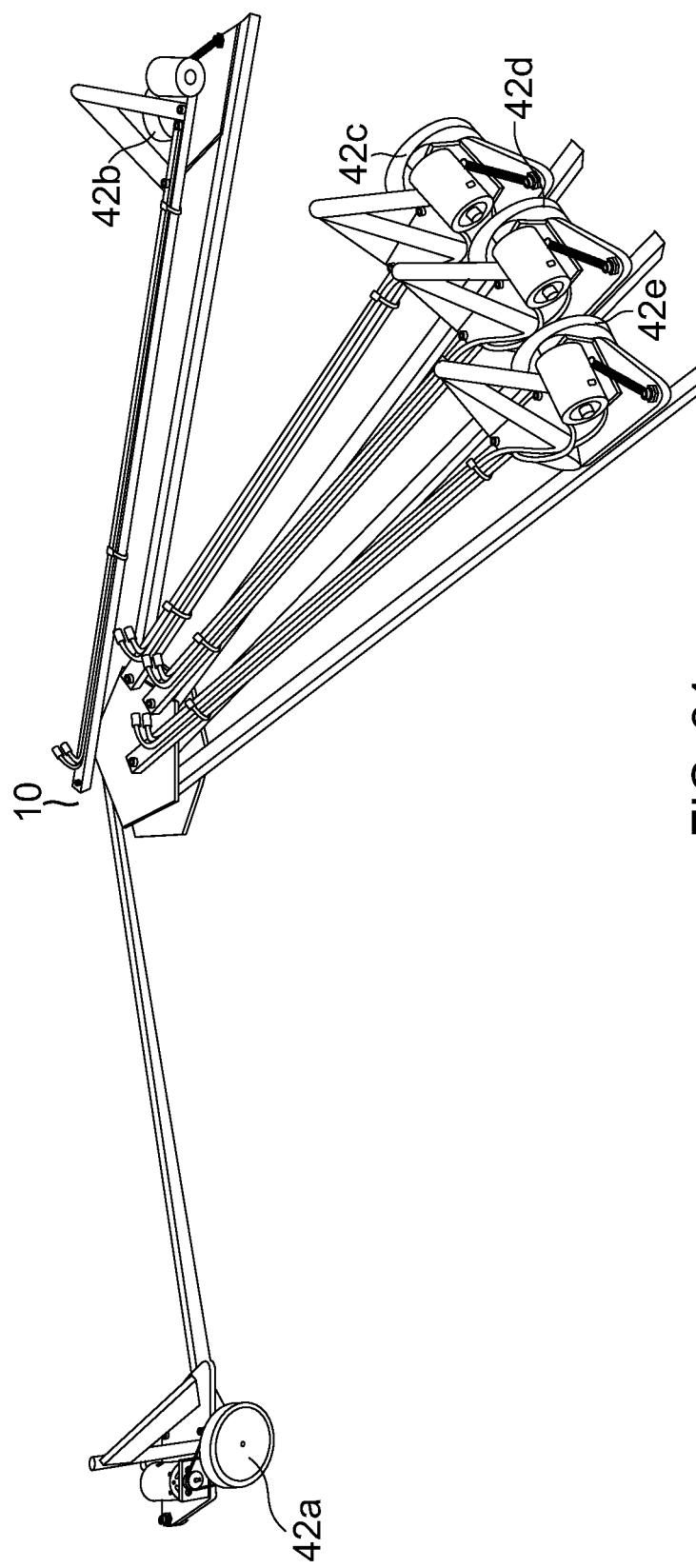
FIG. 24 illustrates the embodiment of FIG. 23 with the wheel assemblies coming together.

In FIG. 23, one bolt has been removed with respect to each radial strut at the hub, such that the wheels 42a-e may be moved together, as seen in both FIGS. 21 and 22. In a fully collapsed configuration of FIG. 23, the wheels 42a-e have been moved adjacent to one another, and the assembly is ready for transport.

In one embodiment, the assembly may be lifted at the hub and pulled along at the wheels. Alternatively, the assembly may be loaded into a truck or other vehicle for transport. In this way, a preferred embodiment is transportable and can be re-configured and put into operation at another location with relative ease.

Concerning materials, the struts may be made of any of a variety of materials, including strong and lightweight metals, composites and polymers. The sails can be made from sail cloth or other material suitable for a sail. In one embodiment, a portion or all of the sail may be fitted with or made of a film that coverts sunlight into electricity. One source of such films is Konarka Technologies, Inc. of Lowell, Mass. Thus, the system can be adapted to generate power even in low or no-wind conditions.

Considering now the wheels in particular, in one embodiment the wheels are inflatable tires, as would be used on a car or truck. The size of the wheels depends on the overall size of the system, and the wheels can be sealed to meet the requirements of a particular system. In another embodiment, the wheel has a base disc made of a metal or similar material, and a rubber surface. Many variations may be employed when selecting a wheel.

Concerning the sails, various sail configurations may be employed. Conventional sailboat sails and rigging can be employed to harvest wind energy by driving the construct around the fixed hub. These sails will be automatically controlled by tension devices that are attached to some portion of the sail, usually (but not limited to) the boom. The simplest manifestation of this tension device would be a tension spring that resists displacement of the sail more or less linearly with increasing displacement of the sail, as discussed previously.

One efficient alternative form of sail would be the "sail wing". This is a vertical wing similar to an aircraft wing replacing the cloth sail. This wing may be controlled in rotation about a vertical axis much like the cloth sail. Sail wings are generally symmetrical in cross section so as to produce thrust when upwind or downwind while moving along the periphery of the construct. A better lift-to-drag ratio can be realized by articulating the wing section with moveable flaps. Flaps are referred to as camber changing devices. These flaps can be linked to fixed points on the rotating construct so as to present the optimum camber as the wind vector changes. The rigid construction of a sail wing provides a surface onto which thin film photovoltaic material can be easily applied so as to harvest sunlight.

In another embodiment, the sail is a flexible wing sail which we refer to as a "flex sail" herein. A critical part of any wing is the leading edge. The leading edge of a wing determines the airflow over the rest of the wing. A conventional sail has a round leading edge (the mast). This round tube is not an optimal streamlined shape. A wing has a more-or-less elliptical leading edge followed by correctly-shaped streamlining (fairing), which enables the wing to produce more lift with less drag, i.e. a better lift-to-drag ratio.

In one embodiment, the flex sail concept is a method of producing a high-efficiency sail. The sail material of choice for this concept is a flexible material such as a thin fiberglass and resin construct or a relatively thin plastic sheet. These materials will bend in one plane only and not form compound curves as can a cloth sail. One inexpensive material that may be used is derived from recycled plastic bottles and containers. This material will often be PET (polyethylene terephthalate) or similar plastic. This controlled-flexibility material has another advantage in that the single-plane bending will facilitate mounting or infusing solar energy-harvesting materials.

Figure 26:
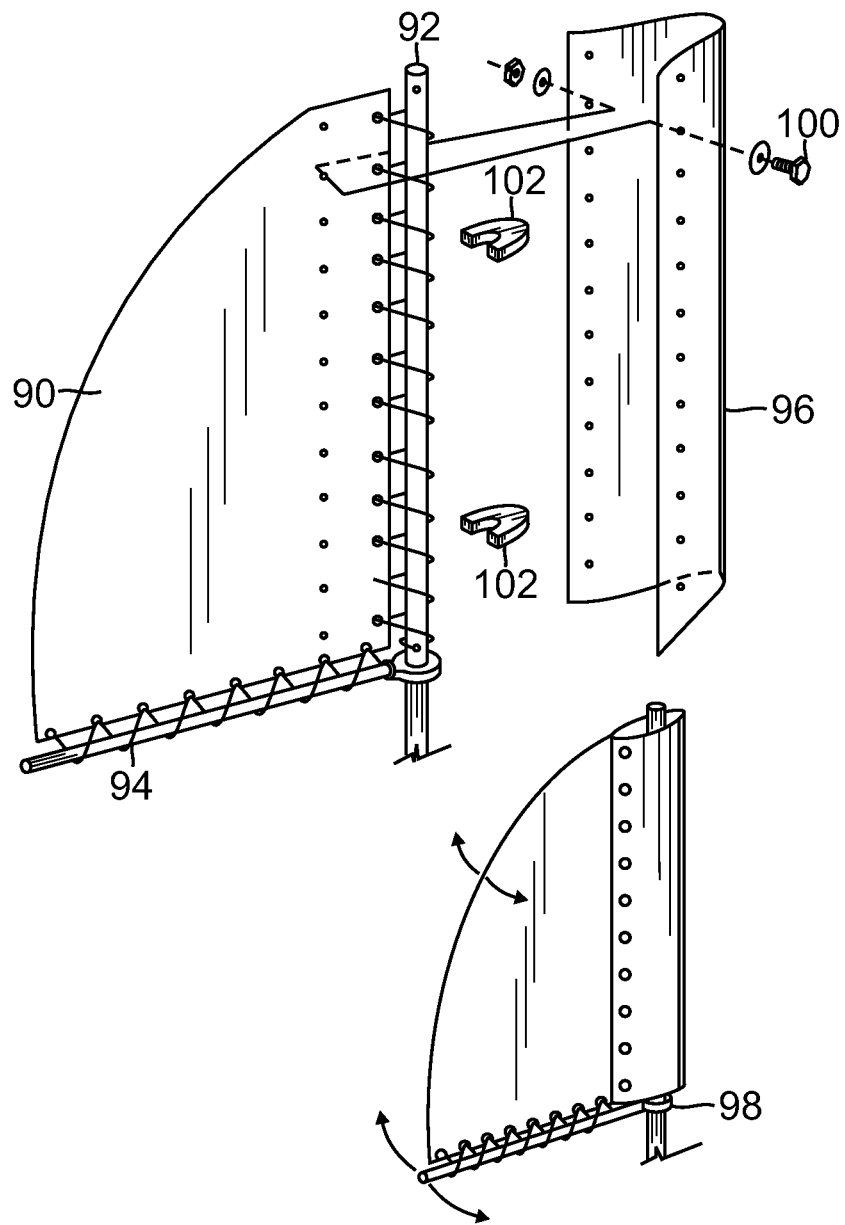
FIG. 26 illustrates an embodiment of a flex sail.

As shown in FIG. 26, a single surface sail 90 is attached to the mast 92 with cord 94, and an aerodynamic-shaped leading edge fairing 96 covers the mast/sail joint 98. The fairing 96 is attached to the sail in a manner that allows relative motion between the sail and fairing 96, such as by attaching an edge or edges of the fairing 96 to the sail 90 with bolts, locknuts or the like 100, to help optimize the aerodynamics between the fairing and sail, as well as reducing the mechanical stresses at that joint. Leading edge formers 102 made of formed polymer may be located in between the fairing 96 and the mast 92, to help maintain the shape of the leading edge of the fairing 96.

In one embodiment, the sail 90 material is thin semi-rigid plastic, roughly 2 mm thick, although this thickness may be varied depending on expected wind conditions and other factors. The fairing 96 is preferably pre-formed for rapid assembly of the sail. The fairing folds over the mast and is then attached to the sail 90. When complete, the flex sail construct can rotate around the mast 92.

Figure 27:
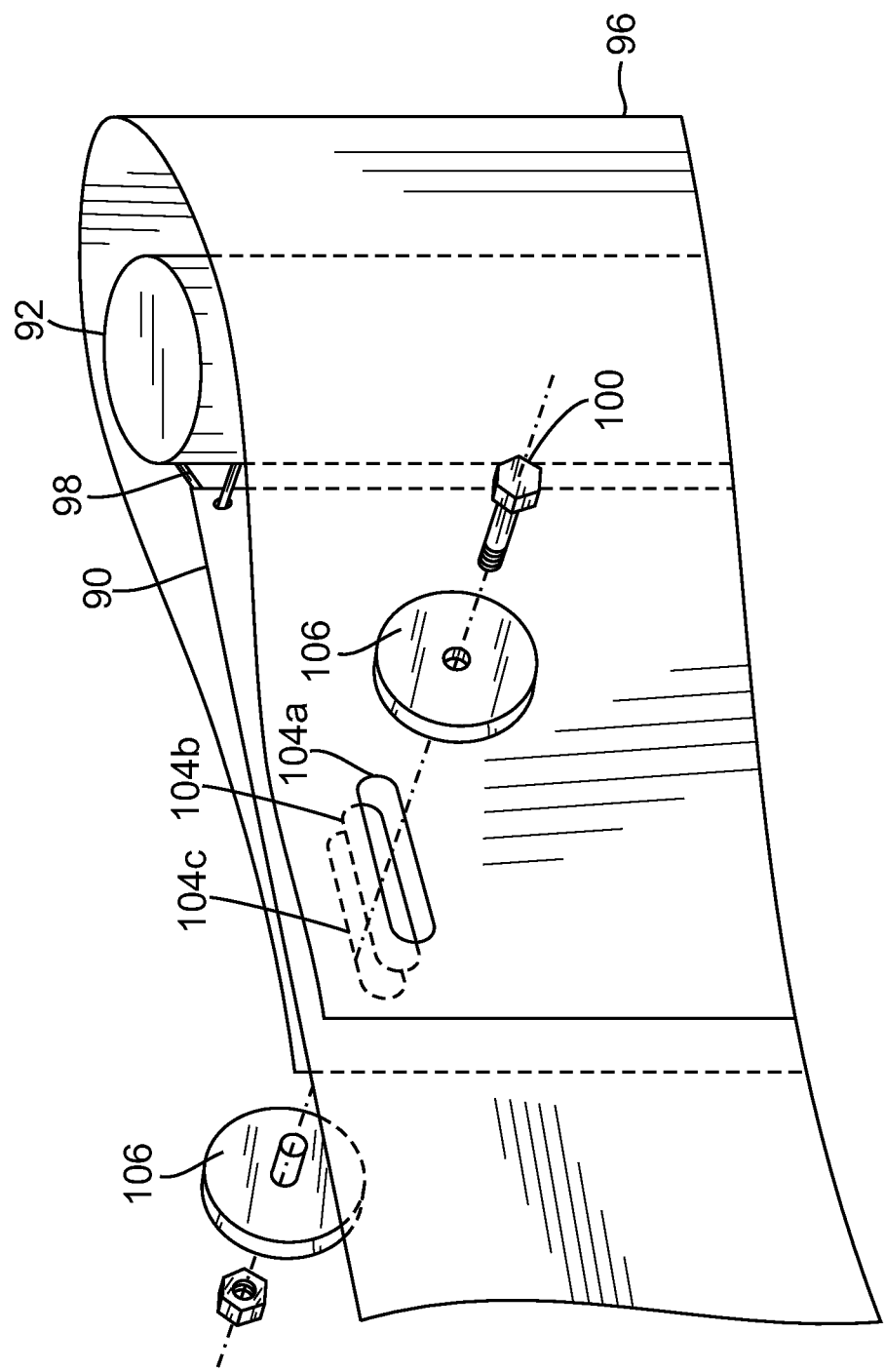
FIG. 27 illustrates an alternative embodiment of a flex sail having slots to permit relative motion between the sail and the sides of the fairing.
Figure 28:
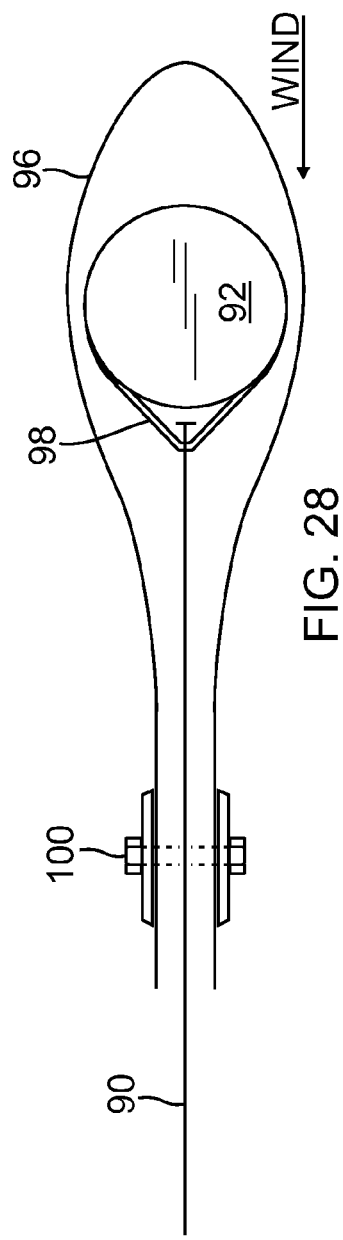
FIG. 28 illustrates the alternative flex sail embodiment of FIG. 27 in which the sail is oriented directly into the wind.
Figure 29:
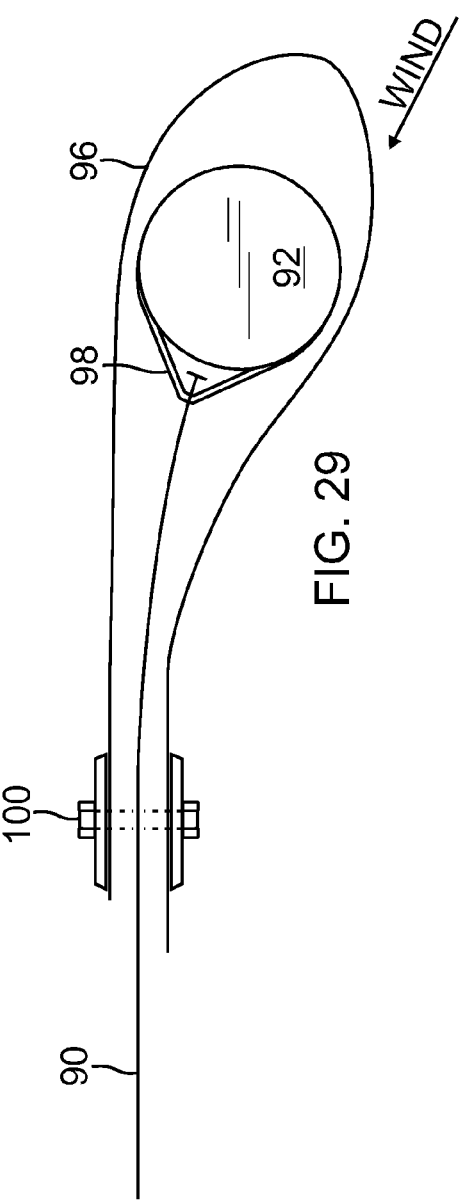
FIG. 29 illustrates the alternative flex sail embodiment of FIG. 27 in which the sail is deflected by the wind.
Figure 30:
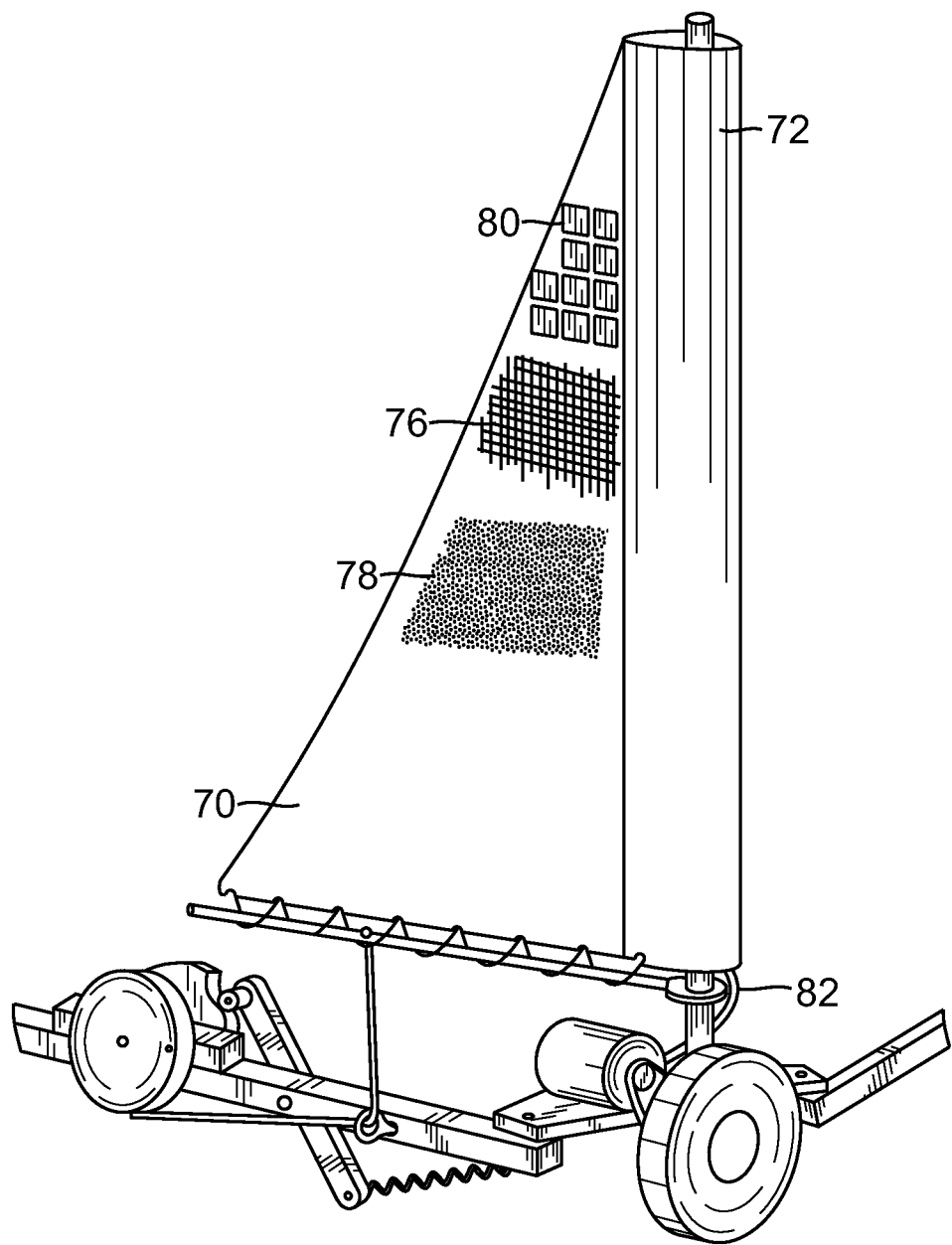
FIG. 30 illustrates alternative sail embodiments in which methods for generating solar power are incorporated.

FIG. 27 illustrates an alternative sail wing in which slots 104a-e are provided in the fairing and in the sail, respectively, rather than the simple holes of the embodiment of FIG. 26. The slots 104 allow relative motion between the sail 90 and the sides of the fairing 96. Stepped discs 106 have a raised lip around the hole and may be used to allow tightening the bolt without clamping the sail, thereby allowing relative motion or sliding between the sail and the sides of the fairing. FIG. 28 illustrates the alternative sail wing of FIG. 27 when the sail is pointed into the wind. In FIG. 29, the sail is deflected by the wind, thereby forming an efficient cambered air foil for good lift-to-drag ratio. In this sense, the flex wing sail flexes in response to the wind direction.

As a further alternative form of sail, a "hybrid" sail wing could be the combining of a rigid leading edge portion with a cloth sail aft. The cloth sail portion would act as the articulated flap, but would be less expensive to manufacture and a more robust structure. Photovoltaic can be incorporated into a leading edge construct of a sail assembly, such as in FIG. 27, in which a sail 70 has a semi-rigid leading edge 72. Photovoltaic cells, a photovoltaic laminate and/or solar cells may be mounted on the structure that forms the semi-rigid leading edge.

A few embodiments of methods for generating solar electricity utilizing a sail 70 are illustrated in FIG. 27. A flexible film 74 of solar energy collecting material can be laminated into or otherwise attached to part or all of the sail 70 itself. In a preferred embodiment, the solar film 74 should be robust enough to withstand the rigors of sail activity without being laminated to a substrate. One such flexible film of solar energy collecting material is available from Konarka Technologies of Lowell, Mass. The flexible film may alternatively be provided as solar sensitive strips.

Alternatively, a solar sensitive material 78 known in the art may be coated onto the sail and/or infused into the sail material. An alternative coating, which may be applied with a roller, is described in an article by Jung and Jo entitled, "*Annealing-Free High Efficiency and Large Area Polymer Solar Cells Fabricated by a Roller Painting Process,*" in *Advanced Functional Materials*, Volume 20, Issue 14, pages 2355-2363 (Jul. 23, 2010). As another alternative, solar sensitive strips may be laminated onto the sail, or solar cells 80 attached to the sail. Conductive wires 82 extend from the sail to conduct off solar-generated electricity from the sail 70.

Figure 31:
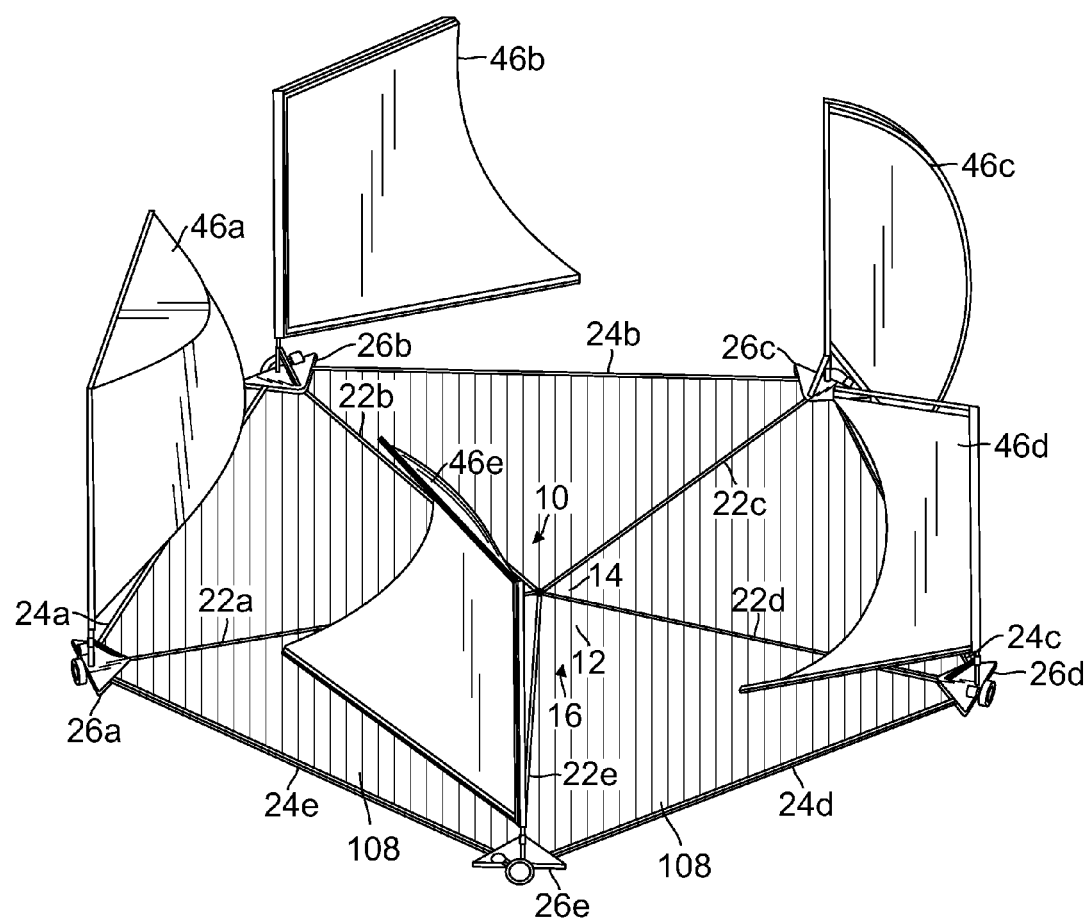
FIG. 31 illustrates an alternative embodiment in which a solar film extends about the interior portion of the system, bounded on the exterior by the circumferential struts 24a-e.

In another embodiment adapted to generate solar power, solar panels and/or a sheet or sheets of solar-power generating film may extend atop or below the area interior to the circumferential struts 24a-e. In one embodiment that is illustrated in FIG. 31, the radial struts 22a-e support the solar power-generating film and/or solar power-generating panels. Thus, whether the assembly is rotating or stationary, solar power may be generated when the system is exposed to sunlight. Thin film solar modules are available from First Solar, Inc. of Tempe, Ariz. Solar power generating films that are used specifically for airfoils are generally discussed, for example, in an article entitled, *Solar Plane Takes Flight*, in Design News, Oct. 18, 2010.

There are many applications for embodiments of the present invention. As mentioned earlier, one application is to use the system in conjunction with military operations. The system may be set up in a remote location to generate power at a camp, for example. The system may then be broken down and taken to a different location when the camp moves. Of the many other applications, another is to mount a system according to the present invention atop a building, to take advantage of the wind atop the building. The system may operate directly on the roof, or a platform may be constructed on which the system is mounted.

Generally, the preferred embodiment is lightweight relative to power produced, due to the distributed loading inherent in the embodiments of FIGS. 1 and 2, for example. Structural loads are shared through many support points (frame, wheels, etc.). Loads are distributed due to the semi-flexible arrangement of struts. Lightweight materials, such as aluminum, may be used or composite materials such as pultruded plastic tubes reinforced with fibers such as fiberglass or carbon fiber. The flat plate parts of the structure can be of composite sandwich material, which has a lightweight core, covered with fiber reinforced plastic, as alternatives.

Figure 25:
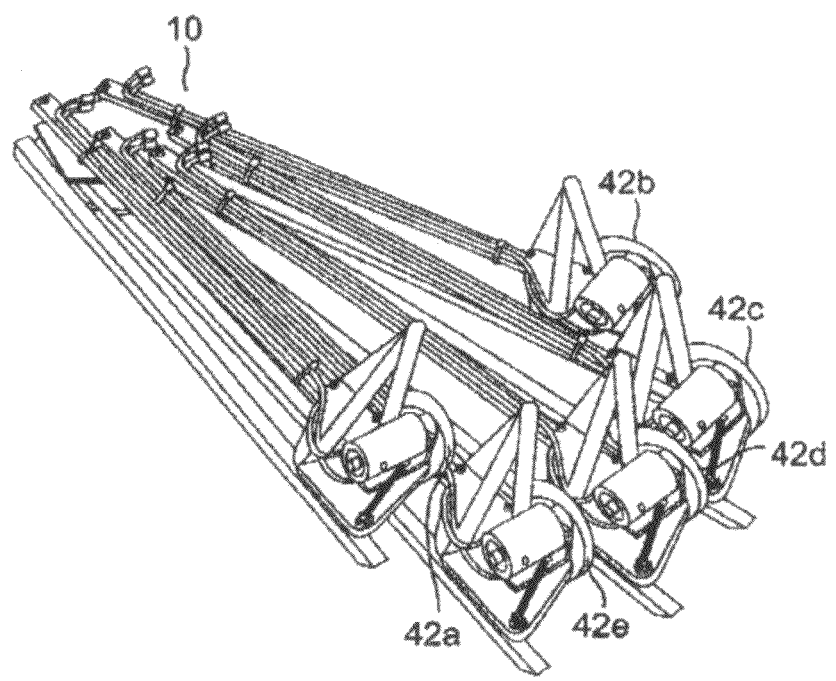
FIG. 25 illustrates the embodiment of FIG. 24 in a fully collapsed configuration.

A preferred embodiment is also easily erected and the surface on which it will be mounted often needs little preparation work. Very little infrastructure is required. The entire construct can be unbolted and the parts stowed in a container, such as a box or otherwise. Individual parts in a preferred embodiment are light enough to be moved and erected by hand. In one embodiment, a complete structure can be partially unbolted and folded to allow it to be towed on its own wheels. (See. e.g., FIG. 25).

It will be apparent from the foregoing that, while particular forms of the invention have been illustrated and described, various modifications can be made without parting from the spirit and scope of the invention. For example, there can be wheels interconnected to one or more generators, or many wheels connected to one generator. These wheels can be pneumatic tires or solid wheels, or tracks similar to tank tracks.

What is claimed is:

1. A system for converting wind power to electrical energy comprising:
    a peripheral frame capable of being place in a folded configuration;
    sails interconnected to the peripheral frame;
    a hub around which the peripheral frame is rotatable;
    radial struts extending from the hub to the peripheral frame, wherein the said radial struts bear a full dynamic load from the sails and carry electrical wires;
    wheels mounted on the peripheral frame; and
    a plurality of electric generators, each electric generator being interconnected with at least one respective wheel, the hub being in electrical communication with the electric generators using the said electrical wires on the said radial struts; and
    wherein the said system generates electrical energy at low wind speeds less than 12 miles per hour, is portable and can be quickly deployed.

2. A system for converting wind power as described in claim 1, wherein the sails are interconnected, with the peripheral frame on respective masts, each mast having a base and the mast being pivotable about the base.

3. A system as defined in claim 1, wherein at least one sail is interconnected with a spring, to restrain motion of the sail.

4. A system as defined in claim 3, wherein the spring is mounted on the peripheral frame.

5. A system as defined in claim 4, wherein a sheet interconnects the spring with the sail.

6. A system as defined in claim 1, wherein the sail is a sail wing.

7. A system as described in claim 1, in which the system includes a fairing at the leading edge of the mast, the fairing being secured to the sail.

8. A system as defined in claim 7, wherein the sail is a sail wing.

9. A system as defined in claim 7, wherein at least one sail is interconnected with a spring, to restrain the motion of the sail.

* * * * *